(12) United States Patent
Parvulescu et al.

(10) Patent No.: US 12,264,076 B2
(45) Date of Patent: Apr. 1, 2025

(54) PROCESS FOR THE PRODUCTION OF THE CHA-AFT ZEOLITE INTERGROWTH COE-10 AND USE THEREOF IN HETEROGENEOUS CATALYSIS

(71) Applicant: BASF MOBILE EMISSIONS CATALYSTS LLC, Iselin, NJ (US)

(72) Inventors: Andrei-Nicolae Parvulescu, Ludwigshafen am Rhein (DE); Ulrich Mueller, Ludwigshafen am Rhein (DE); Toshiyuki Yokoi, Tokyo (JP); Ute Kolb, Mainz (DE); Yong Wang, Tokyo (JP); Yasar Krysiak, Mainz (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 673 days.

(21) Appl. No.: 17/594,875

(22) PCT Filed: May 14, 2020

(86) PCT No.: PCT/EP2020/063486
§ 371 (c)(1),
(2) Date: Nov. 2, 2021

(87) PCT Pub. No.: WO2020/229609
PCT Pub. Date: Nov. 19, 2020

(65) Prior Publication Data
US 2022/0324716 A1  Oct. 13, 2022

(30) Foreign Application Priority Data
May 15, 2019 (EP) ...................................... 19174643

(51) Int. Cl.
*C01B 39/46* (2006.01)
(52) U.S. Cl.
CPC ................................... *C01B 39/46* (2013.01)
(58) Field of Classification Search
None
See application file for complete search history.

(56) References Cited

U.S. PATENT DOCUMENTS

| 6,334,994 | B1 | 1/2002 | Wendelbo et al. | |
|---|---|---|---|---|
| 7,094,389 | B2 * | 8/2006 | Cao | C01B 37/02 423/709 |
| 8,932,973 | B2 | 1/2015 | Andersen et al. | |
| 9,517,458 | B2 | 12/2016 | Li et al. | |
| 10,639,594 | B2 | 5/2020 | Imasaka et al. | |
| 11,541,378 | B2 | 1/2023 | Shannon et al. | |
| 2012/0189518 | A1 * | 7/2012 | Andersen | B01J 29/80 423/213.2 |
| 2016/0304457 | A1 * | 10/2016 | Collier | C07D 211/14 |
| 2019/0127231 | A1 | 5/2019 | Xie et al. | |

FOREIGN PATENT DOCUMENTS

| EP | 3167951 | A1 | 5/2017 |
|---|---|---|---|
| JP | 2013-522011 | A | 6/2013 |
| JP | 2015-502909 | A | 1/2015 |
| JP | 2022-525280 | A | 5/2022 |
| KR | 10-2014-0107365 | A | 9/2014 |
| WO | WO 98/15496 | A1 | 4/1998 |
| WO | WO 02/070407 | A1 | 9/2002 |
| WO | WO 2013/068976 | A1 | 5/2013 |
| WO | 2016/006564 | A1 | 4/2016 |
| WO | WO2018079569 | * | 5/2018 |
| WO | WO 2019/024909 | A1 | 2/2019 |

OTHER PUBLICATIONS

International Search Report dated Jun. 16, 2020, PCT/EP2020/063486.
Skeels et al., "Synthesis and characterization of phi-type zeolites LZ-276 and LZ-277: . . . ," Microporous and Mesoporous Materials, vol. 30, No. 2-3, Sep. 1, 1999, pp. 335-346.
Sarika et al., Synthesis of Zeolites via Interzeolite Transformations without Organic Structure . . . , Chemistry of Materials, vol. 27, No. 6, Mar. 24, 2015, pp. 2066.
Yuewei et al., "Organic-Free Synthesis of CHA-Type Zeolite Catalysts for the Methanol-to-Olefins Reaction," ACS Catalysis, vo. 5, No. 7, Jul. 2, 2015, pp. 4456-4465.
Naraki et al., "ZTS-1 and ZTS-2: Novel itergrowth zeolites with AFX/CHA structures," Microporous and Mesoporous Materials, vol. 254, Apr. 5, 2017 pp. 160-169.
Wilson et al., "Synthesis, characterization and structure of SAPO-56, . . . ," Microporous and Mesoporous Materials, vol. 28, No. 1, Mar. 1, 2019, pp. 125-137.

(Continued)

Primary Examiner — Sheng H Davis
(74) Attorney, Agent, or Firm — DLA Piper LLP (US)

(57) ABSTRACT

A process for the production of a zeolitic material comprising one or more zeolite intergrowth phases of one or more zeolites having a CHA-type framework structure comprising $SiO_2$ and $X_2O_3$, and one or more zeolites having an AFT-type framework tructure comprising $SiO_2$ and $X_2O_3$, wherein X is a trivalent element, and wherein said process comprises: (1) preparing a mixture comprising one or more sources for $SiO_2$, one or more sources for $X_2O_3$, and seed crystals comprising a zeolitic material, said zeolitic material comprising $SiO_2$ and $X_2O_3$ in its framework structure and having a CHA-type framework structure; (2) heating the mixture prepared in (1) for obtaining a zeolitic material comprising one or more zeolite intergrowth phases; and (R) subjecting the zeolitic material obtained in (2) to a procedure for removing at least a portion of X from the framework structure of the zeolitic material.

14 Claims, 11 Drawing Sheets

(56) References Cited

OTHER PUBLICATIONS

B. N. Bhadra et al.: "Conversion of Ethylene into Propylene with the Siliceous SSZ-13 Zeolite prepared without an organic structure-directing agent" in Journal of Catalysis 2018, 365, pp. 94-104.

* cited by examiner

PROCESS FOR THE PRODUCTION OF THE CHA-AFT ZEOLITE INTERGROWTH COE-10 AND USE THEREOF IN HETEROGENEOUS CATALYSIS This application is a national stage filing under 35 U.S.C. § 371 of International Application No. PCT/EP2020/063486 filed on May 14, 2020, which claims priority to European Application No. 19174643.7, filed on May 15, 2019; the content of each application is incorporated herein by reference in its entirety.

TECHNICAL FIELD

The present invention relates to a process for the production of a zeolitic material comprising one or more zeolite intergrowth phases of one or more zeolites having a CHA-type framework structure and one or more zeolites having an AFT-type framework structure, and in particular to COE-10, as well as to a synthetic zeolitic material comprising one or more zeolite intergrowth phases of one or more zeolites having a CHA-type framework structure and one or more zeolites having an AFT-type framework structure as obtainable according to the inventive process, and in particular to COE-10. Furthermore, the present invention relates to a synthetic zeolitic material comprising one or more zeolite intergrowth phases of one or more zeolites having a CHA-type framework structure and one or more zeolites having an AFT-type framework structure per se, and in particular to COE-10, as well as to the use of such a material per se or as obtainable according to the inventive process, in particular as a heterogeneous catalyst.

INTRODUCTION

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 5th edition, Elsevier, London, England (2001).

Among said zeolitic materials, Chabazite is a well studied example, wherein it is the classical representative of the class of zeolitic materials having a CHA framework structure. Besides aluminosilicates such as Chabazite, the class of zeolitic materials having a CHA framework structure comprises a large number of compounds further comprising phosphorous in the framework structure are known which are accordingly referred to as silicoaluminophosphates (SAPO). In addition to said compounds, further molecular sieves of the CHA structure type are known which contain aluminum and phosphorous in their framework, yet contain little or no silica, and are accordingly referred to as aluminophosphates (APO). Zeolitic materials belonging to the class of molecular sieves having the CHA-type framework structure are employed in a variety of applications, and in particular serve as heterogeneous catalysts in a wide range of reactions such as in methanol to olefin catalysis and selective catalytic reduction of nitrogen oxides $NO_x$ to name some two of the most important applications. Zeolitic materials of the CHA framework type are characterized by three-dimensional 8-membered-ring (8MR) pore/channel systems containing double-six-rings (D6R) and cages.

Among the methods for the synthesis of zeolites having a CHA-type framework structure, WO 2013/068976 A1 concerns an organotemplate-free synthetic process for the production of a zeolitic material of the CHA-type framework structure.

US 2012/0189518 A1 concerns a catalyst for the selective catalytic reduction of $NO_x$ having one or more transition metals selected from a list including iron and copper, wherein the molecular sieve has at least one intergrowth phase of at least two different small-pore, three-dimensional framework structures. Preferred intergrowth phases disclosed in said document are selected from the group consisting of AEI, GME, AFX, AFT and LEV with CHA as the second framework structure of the respective intergrowth phase, wherein the intergrowth phase between AEI and CHA is particularly preferred. The materials taught in US 2012/0189518 A1, however, are silicoaluminophosphates.

Similarly, U.S. Pat. No. 6,334,994 B1, WO 98/15496 A1, and WO 02/070407 A1 relate to silicoaluminophate intergrowths of AEI and CHA, wherein said materials are employed as heterogeneous catalysts in the conversion of methanol to olefins.

WO 2019/024909 A1, on the other hand, concerns the synthesis of a zeolitic material comprising a transition metal and one or more of potassium and cesium as well as to its use as a catalyst in the selective catalytic reduction of nitrogen oxides using ammonia as a reductant.

Bhadra, B. N. et al. in Journal of Catalysis 2018, 365, pp. 94-104, concerns the conversion of ethylene to propylene with SSZ-13 prepared without an organic structure-directing agent which is subsequently steamed. More specifically, said article discusses the steaming of such materials including SSZ-13 prepared from interzeolitic conversion of zeolite Y in the presence of potassium ions. Latter materials are stated as having a poorer stability, and displaying a significantly poorer performance in the conversion of ethylene to propylene than SSZ-13 prepared from a mixture containing seed crystals and devoid of potassium ions.

G. W. Skeels et al. disclose in Microporous and Mesoporous Materials a study on zeolites that may be described as a chabazite topology with faulting along c, being the stacking direction in these ABC double six-ring (D6R) materials. Said zeolites are named LZ-276 and may be prepared by crystallizing a zeolite from a synthesis gel at 125° C.

EP 3 167 953 A1 discloses hydrothermal synthesis of a zeolite membrane having CHA crystal structure using an aqueous reaction mixture wherein non-dealuminated FAU zeolite is used as the Si element source and the Al element source.

S. Goel et al. disclose a study on the synthesis of zeolites via interzeolite transformations without organic structure-directing agents, whereby it is reported that high-silica MFI, CHA, STF, and MTW zeolites from FAU or BEA parent materials.

Y. Ji et al. disclose a study on organic-free synthesis of CHA-type zeolite catalysts for the methanol-to-olefins reaction, whereby CHA type zeolites were prepared from the hydrothermal conversion of FAU type zeolites and further dealuminated.

Y. Naraki et al. disclose novel intergrowth zeolites with AFX/CHA structure. Said intergrowth zeolites, designated as ZTS-1 and ZTS-2, were prepared using dual structure directing agent approach.

St. Wilson et al. disclose a study on synthesis, characterization and structure of SAPO-56, a member of the ABC double-six-ring family of materials with stacking sequence AABBCCBB.

There, however, remains a need for the synthesis of new zeolitic materials displaying new and improved properties, in particular in the field of heterogeneous catalysis.

DETAILED DESCRIPTION

It is therefore an object of the present invention to provide a process for synthesizing new zeolitic materials having new and improved properties, in particular in the field of heterogeneous catalysis. Thus, it has surprisingly been found that the steaming of specific zeolitic materials having a CHA-type framework structure as obtained from organotemplate-free synthesis, and in particular of zeolitic materials comprising one or more zeolite intergrowth phases of zeolites having a CHA-type framework structure and zeolites having an AFT-type framework structure, in particular COE-10, affords a zeolitic material displaying excellent catalytic properties. In particular, it has quite unexpectedly been found that said materials display excellent results in heterogeneous catalysis, and in particular in the conversion of methanol to olefins (MTO), wherein surprisingly the time on stream of said materials in the MTO process may be considerably extended after having been subject to a specific steaming regimen.

Therefore, the present invention relates to a process for the production of a zeolitic material comprising one or more zeolite intergrowth phases of one or more zeolites having a CHA-type framework structure comprising $SiO_2$ and $X_2O_3$, and one or more zeolites having an AFT-type framework structure comprising $SiO_2$ and $X_2O_3$, wherein X is a trivalent element, and wherein said process comprises:
(1) preparing a mixture comprising one or more sources for $SiO_2$, one or more sources for $X_2O_3$, and seed crystals comprising a zeolitic material, said zeolitic material comprising $SiO_2$ and $X_2O_3$ in its framework structure and having a CHA-type framework structure;
(2) heating the mixture prepared in (1) for obtaining a zeolitic material comprising one or more zeolite intergrowth phases of one or more zeolites having a CHA framework structure and one or more zeolites having an AFT-type framework structure; and
(R) subjecting the zeolitic material obtained in (2) to a procedure for removing at least a portion of X, preferably tetrahedrally coordinated X, from the framework structure of the zeolitic material.

Further, the present invention relates to a synthetic zeolitic material comprising one or more zeolite intergrowth phases of one or more zeolites having a CHA-type framework structure and one or more zeolites having an AFT-type framework structure, wherein the zeolitic material is obtainable and/or obtained according to the process of any one of the embodiments as disclosed herein.

Yet further, the present invention relates to a synthetic zeolitic material, preferably obtainable and/or obtained according to the process of any one of the embodiments as disclosed herein, comprising one or more zeolite intergrowth phases of one or more zeolites having a CHA-type framework structure comprising $SO_2$ and $X_2O_3$, and one or more zeolites having an AFT-type framework structure comprising $SiO_2$ and $X_2O_3$, wherein X is a trivalent element, and wherein in the CO FT-IR spectrum of the zeolitic material measured in the wavenumber range of from 3,000 to 3,800 $cm^{-1}$ at a pressure of 1,000 Pa, the absorbance band with the highest negative absorbance displays its minimum in the range of from 3,580 to 3,700 $cm^{-1}$, preferably from 3,600 to 3,680 $cm^{-1}$, more preferably from 3,620 to 3,670 $cm^{-1}$, more preferably from 3,630 to 3,660 $cm^{-1}$, and more preferably from 3,640 to 3,650 $cm^{-1}$,
and the absorbance band with the highest positive absorbance displays its maximum in the range of from 3,350 to 3,560 $cm^{-1}$, preferably from 3,370 to 3,540 $cm^{-1}$, more preferably from 3,390 to 3,520 $cm^{-1}$, more preferably from 3,410 to 3,500 $cm^{-1}$, more preferably from 3,430 to 3,480 $cm^{-1}$, and more preferably from 3,450 to 3,460 $cm^{-1}$.

Yet further, the present invention relates to a use of a synthetic zeolitic material according to any one of the embodiments as disclosed herein as a molecular sieve, as an adsorbent, for ion-exchange, or as a catalyst and/or as a catalyst support, preferably as a catalyst for the selective catalytic reduction (SCR) of nitrogen oxides $NO_x$; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_x$, and more preferably for the selective catalytic reduction (SCR) of nitrogen oxides $NO_x$ in exhaust gas from a combustion engine, preferably from a diesel engine or from a lean burn gasoline engine, wherein more preferably the zeolitic material in the conversion of alcohols to olefins, and more preferably in methanol to olefin (MTO) catalysis.

It is preferred that the zeolitic material obtained in (2) comprising one or more zeolite intergrowth phases of one or more zeolites having a CHA framework structure and one or more zeolites having an AFT-type framework structure, comprises COE-10, wherein more preferably the zeolitic material obtained in (2) is COE-10.

The zeolitic material comprised in the seed crystals may be prepared according to any known method. It is preferred that the zeolitic material comprised in the seed crystals in (1) is obtained by a process comprising:
(A) preparing a mixture comprising one or more structure directing agents and a first zeolitic material comprising $SiO_2$ and $X_2O_3$ in its framework structure, wherein the first zeolitic material has an FAU-, FER-, TON-, MTT-, BEA-, and/or MFI-type framework structure, and preferably has an FAU-type framework structure;
(B) heating the mixture obtained in (A) for obtaining a second zeolitic material comprising $SiO_2$ and $X_2O_3$ in its framework structure, wherein the second zeolitic material has a CHA-type framework structure.

It is preferred that the first zeolitic material having an FAU-type framework structure comprises one or more zeolites having an FAU-type framework structure, wherein the one or more zeolites having an FAU-type framework structure are selected from the group consisting of Li-LSX, zeolite X, zeolite Y, ECR-30, ZSM-20, LZ-210, SAPO-37, US-Y, CSZ-1, ZSM-3, Faujasite, and mixtures of two or more thereof, more preferably from the group consisting of zeolite X, zeolite Y, ECR-30, ZSM-20, LZ-210, US-Y, CSZ-1, ZSM-3, Faujasite, and mixtures of two or more thereof, more preferably from the group consisting of zeolite X, zeolite Y, ZSM-20, ZSM-3, Faujasite, and mixtures of two or more thereof, more preferably from the group consisting of zeolite X, zeolite Y, Faujasite, and mixtures of two or more thereof. It is particularly preferred that the one or more zeolites having an FAU-type framework structure comprise zeolite X and/or zeolite Y, preferably zeolite Y, wherein more preferably the one or more zeolites having an FAU-type framework structure is zeolite X and/or zeolite Y, preferably zeolite Y.

It is preferred that the mixture prepared in (1) and heated in (2) contains substantially no organotemplate. It is thus preferred that the inventive process as disclosed herein is carried out in the absence of an organotemplate. It is particularly preferred that the mixture prepared in (1) and heated in (2) comprises 1 wt.-% or less of an organotemplate, based on the total weight of the mixture, preferably 0.5 wt.-% or less, more preferably 0.1 wt.-% or less, more preferably 0.05 wt.-% or less, more preferably 0.01 wt.-% or less, more preferably 0.005 wt.-% or less, and more preferably 0.001 wt.-% or less.

It is preferred that the mixture prepared in (A) and heated in (B) contains substantially no phosphorous and/or phosphorous containing compounds. It is thus preferred that the process for preparing the zeolitic material comprised in the seed crystals in (1) is carried out in the absence of phosphorous and/or phosphorous containing compounds. It is particularly preferred that the mixture prepared in (A) and heated in (B) comprises 1 wt.-% or less of phosphorous and/or phosphorous containing compounds, calculated as element and based on the total weight of the mixture, preferably 0.5 wt.-% or less, more preferably 0.1 wt.-% or less, more preferably 0.05 wt.-% or less, more preferably 0.01 wt.-% or less, more preferably 0.005 wt.-% or less, and more preferably 0.001 wt.-% or less.

It is preferred that the framework of the zeolitic material obtained in (B) contains substantially no phosphorous, wherein more preferably the zeolitic material obtained in (B) contains substantially no phosphorous and/or phosphorous containing compounds. It is particularly preferred that the framework of the zeolitic material obtained in (B), more preferably the zeolitic material obtained in (B), comprises 1 wt.-% or less of phosphorous, calculated as element and based on the total weight of the zeolitic material, preferably 0.5 wt.-% or less, more preferably 0.1 wt.-% or less, more preferably 0.05 wt.-% or less, more preferably 0.01 wt.-% or less, more preferably 0.005 wt.-% or less, and more preferably 0.001 wt.-% or less.

It is preferred that the mixture prepared in (1) and heated in (2) contains substantially no phosphorous and/or phosphorous containing compounds. It is thus preferred that the inventive process as disclosed herein is carried out in the absence of phosphorous and/or phosphorous containing compounds. It is particularly preferred that the mixture prepared in (1) and heated in (2) comprises 1 wt.-% or less of phosphorous, calculated as element and based on the total weight of the mixture, preferably 0.5 wt.-% or less, more preferably 0.1 wt.-% or less, more preferably 0.05 wt.-% or less, more preferably 0.01 wt.-% or less, more preferably 0.005 wt.-% or less, and more preferably 0.001 wt.-% or less.

It is preferred that the framework of the zeolitic material obtained in (2) contains substantially no phosphorous, wherein more preferably the zeolitic material obtained in (2) contains substantially no phosphorous and/or phosphorous containing compounds. It is particularly preferred that the framework of the zeolitic material obtained in (2), more preferably the zeolitic material obtained in (2), comprises 1 wt.-% or less of phosphorous, calculated as element and based on the total weight of the zeolitic material, preferably 0.5 wt.-% or less, more preferably 0.1 wt.-% or less, more preferably 0.05 wt.-% or less, more preferably 0.01 wt.-% or less, more preferably 0.005 wt.-% or less, and more preferably 0.001 wt.-% or less.

The mixture prepared according to (A) may comprise further components. It is preferred that the mixture prepared according to (A) further comprises one or more solvents, wherein said one or more solvents more preferably comprises water, preferably distilled water, wherein more preferably water is contained as the one or more solvents in the mixture prepared according to (A), preferably distilled water.

It is preferred that the mixture prepared in (A) and heated in (B) further comprises at least one source for OH$^-$, wherein said at least one source for OH$^-$ preferably comprises a metal hydroxide, more preferably a hydroxide of an alkali metal M, more preferably sodium and/or potassium hydroxide, and more preferably sodium hydroxide, wherein more preferably the at least one source for OH$^-$ is sodium hydroxide.

It is preferred that the second zeolitic material having a CHA-type framework structure comprises one or more zeolites having a CHA-type framework structure, wherein the one or more zeolites having a CHA-type framework structure are selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li—Na| [Al—Si—O]—CHA, (Ni(deta)2)-UT-6, SSZ-13, and SSZ-62, including mixtures of two or more thereof, more preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof, more preferably from the group consisting of Chabazite, Linde D, Linde R, SAPO-34, SSZ-13, and SSZ-62, including mixtures of two or more thereof, more preferably from the group consisting of Chabazite, SSZ-13, and SSZ-62, including mixtures of two or three thereof, wherein more preferably the second zeolitic material obtained in (B) comprises chabazite and/or SSZ-13, preferably SSZ-13, and wherein more preferably the second zeolitic material obtained in (B) is chabazite and/or SSZ-13, preferably SSZ-13.

It is preferred that the one or more structure directing agents comprises one or more tetraalkylammonium cation-containing compounds.

In the case where the one or more structure directing agents comprises one or more tetraalkylammonium cation-containing compounds, it is preferred that the one or more tetraalkylammonium cation-containing compounds comprise one or more compounds selected from the group consisting of 1-adamantyltri($C_1$-$C_3$)alkylammonium compounds, N,N,N-trimethyl-N-benzylammonium compounds, and mixtures of two or more thereof, more preferably from the group consisting of 1-adamantyltri($C_1$-$C_2$)alkylammonium compounds and mixtures of two or more thereof, more preferably from the group consisting of 1-adamantyltriethylammonium compounds, 1-adamantyldiethyl-methylalkylammonium compounds, 1-adamantylethyl-dimethylammonium compounds, 1-adamantyltrimethylammonium compounds, and mixtures of two or more thereof, wherein more preferably the one or more tetraalkylammonium cation-containing compounds comprise one or more 1-adamantyltrimethylammonium compounds, wherein more preferably the one or more tetraalkylammonium cation-containing compounds consist of one or more 1-adamantyltrimethylammonium compounds.

Further in the case where the one or more structure directing agents comprises one or more tetraalkylammonium cation-containing compounds, it is preferred that the one or more tetraalkylammonium cation-containing compounds comprise one or more compounds selected from the group consisting of N,N,N-tri($C_1$-$C_2$)alkyl-($C_5$-$C_6$)cycloalkylammonium compounds and mixtures of two or more thereof,
more preferably from the group consisting of N,N,N-tri($C_1$-$C_2$)alkyl-cyclopentylammonium compounds, N,N,N-tri($C_1$-$C_2$)alkyl-cyclohexylammonium compounds, and mixtures of two or more thereof,
more preferably from the group consisting of N,N,N-triethyl-cyclohexylammonium compounds, N,N-diethyl-N-methyl-cyclohexylammonium compounds, N,N-dimethyl-N-ethyl-cyclohexylammonium compounds, N,N,N-trimethyl-cyclohexylammonium compounds, and mixtures of two or more thereof,
wherein more preferably the one or more tetraalkylammonium cation-containing compounds comprise one or more N,N,N-trimethyl-cyclohexylammonium compounds,
wherein more preferably the one or more tetraalkylammonium cation-containing compounds consist of one or more N,N,N-trimethyl-cyclohexylammonium compounds.

Further in the case where the one or more structure directing agents comprises one or more tetraalkylammonium cation-containing compounds, it is preferred that the one or more tetraalkylammonium cation-containing compounds comprise one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain.

In the case where the one or more tetraalkylammonium cation-containing compounds comprise one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain, it is preferred that $R^1$ and $R^2$ independently from one another stand for optionally substituted and/or optionally branched ($C_1$-$C_6$)alkyl, more preferably ($C_1$-$C_6$)alkyl, more preferably ($C_1$-$C_4$)alkyl, more preferably ($C_1$-$C_3$)alkyl, and more preferably for optionally substituted methyl or ethyl, wherein more preferably $R^1$ and $R^2$ independently from one another stand for optionally substituted methyl or ethyl, preferably unsubstituted methyl or ethyl, wherein more preferably $R^1$ and $R^2$ independently from one another stand for optionally substituted ethyl, preferably unsubstituted ethyl.

Further in the case where the one or more tetraalkylammonium cation-containing compounds comprise one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain, it is preferred that $R^3$ and $R^4$ form a common derivatized or underivatized, preferably underivatized alkyl chain, more preferably a common ($C_4$-$C_8$)alkyl chain, more preferably a common ($C_4$-$C_7$)alkyl chain, more preferably a common ($C_4$-$C_6$)alkyl chain, wherein more preferably said common alkyl chain is a derivatized or underivatized, preferably underivatized $C_4$ or $C_5$ alkyl chain, and more preferably a derivatized or underivatized, preferably underivatized $C_5$ alkyl chain.

Further in the case where the one or more tetraalkylammonium cation-containing compounds comprise one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain, it is preferred that the one or more tetraalkylammonium cation $R^1R^2R^3R^4N^+$-containing compounds comprise one or more compounds selected from the group consisting of N,N-di($C_1$-$C_4$)alkyl-3,5-di($C_1$-$C_4$)alkylpyrrolidinium compounds, N,N-di($C_1$-$C_4$)alkyl-3,5-di($C_1$-$C_4$)alkylpiperidinium compounds, N,N-di($C_1$-$C_4$)alkyl-3,5-di($C_1$-$C_4$)alkylhexahydro-azepinium compounds, N,N-di($C_1$-C4)alkyl-2,6-di($C_1$-C4)alkylpyrrolidinium compounds, N,N-di($C_1$-$C_4$)alkyl-2,6-di($C_1$-$C_4$)alkylpiperidinium compounds, N,N-di($C_1$-$C_4$)alkyl-2,6-di($C_1$-$C_4$)alkylhexahydroazepinium compounds, and mixtures of two or more thereof,
more preferably from the group consisting of N,N-di($C_1$-$C_4$)alkyl-3,5-di($C_1$-$C_4$)alkylpyrrolidinium compounds, N,N-di($C_1$-$C_4$)alkyl-3,5-di($C_1$-$C_4$)alkylpiperidinium compounds, N,N-di($C_1$-$C_4$)alkyl-3,5-di($C_1$-$C_4$)alkylhexahydroazepinium compounds, N,N-di($C_1$-C4)alkyl-2,6-di($C_1$-$C_4$)alkylpyrrolidinium compounds, N,N-di($C_1$-$C_4$)alkyl-2,6-di($C_1$-$C_4$)alkylpiperidinium compounds, N,N-di($C_1$-C4)alkyl-2,6-di($C_1$-C4)alkylhexahydroazepinium compounds, and mixtures of two or more thereof,
more preferably from the group consisting of N,N-di($C_1$-$C_3$)alkyl-3,5-di($C_1$-$C_3$)alkylpyrrolidinium compounds, N,N-di($C_1$-$C_3$)alkyl-3,5-di($C_1$-$C_3$)alkylpiperidinium compounds, N,N-di($C_1$-$C_3$)alkyl-3,5-di($C_1$-$C_3$)alkylhexahydroazepinium compounds, N,N-di($C_1$-$C_3$)alkyl-2,6-di($C_1$-$C_3$)alkylpyrrolidinium compounds, N,N-di($C_1$-$C_3$)alkyl-2,6-di($C_1$-$C_3$)alkylpiperidinium compounds, N,N-di($C_1$-$C_3$)alkyl-2,6-di($C_1$-$C_3$)alkylhexahydroazepinium compounds, and mixtures of two or more thereof,
more preferably from the group consisting of N,N-di($C_1$-$C_2$)alkyl-3,5-di($C_1$-$C_2$)alkylpyrrolidinium compounds, N,N-di($C_1$-$C_2$)alkyl-3,5-di($C_1$-$C_2$)alkylpiperidinium compounds, N,N-di($C_1$-$C_2$)alkyl-3,5-di($C_1$-$C_2$)alkylhexahydroazepinium compounds, N,N-di($C_1$-$C_2$)alkyl-2,6-di($C_1$-$C_2$)alkylpyrrolidinium compounds, N,N-di($C_1$-$C_2$)alkyl-2,6-di($C_1$-$C_2$)alkylpiperidinium compounds, N,N-di($C_1$-$C_2$)alkyl-2,6-di($C_1$-$C_2$)alkylhexahydroazepinium compounds, and mixtures of two or more thereof,
more preferably from the group consisting of N,N-di($C_1$-$C_2$)alkyl-3,5-di($C_1$-$C_2$)alkylpiperidinium compounds, N,N-di($C_1$-$C_2$)alkyl-2,6-di($C_1$-$C_2$)alkylpiperidinium compounds, and mixtures of two or more thereof,
wherein more preferably the one or more tetraalkylammonium cation $R^1R^2R^3R^4N^+$-containing compounds comprise one or more N,N,N-trimethyl-3,5-dimethylpiperidinium compounds and/or one or more N,N-diethyl-2,6-dimethylpiperidinium compounds, preferably one or more N,N-diethyl-2,6-dimethylpiperidinium compounds
wherein more preferably the one or more tetraalkylammonium cation $R^1R^2R^3R^4N^+$-containing compounds consist of one or more N,N,N-trimethyl-3,5-dimethylpiperidinium and/or one or more N,N-diethyl-2,6-dimethylpiperidinium compounds, preferably one or more N,N-diethyl-2,6-dimethylpiperidinium compounds.

In the case where the one or more tetraalkylammonium cation $R^1R^2R^3R^4N^+$-containing compounds comprise one or more compounds selected from the group consisting of N,N-di($C_1$-$C_4$)alkyl-3,5-di($C_1$-$C_4$)alkylpyrrolidinium compounds, N,N-di($C_1$-$C_4$)alkyl-3,5-di($C_1$-$C_4$)alkylpiperidinium compounds, N,N-di($C_1$-$C_4$)alkyl-3,5-di($C_1$-$C_4$)alkylhexahydroazepinium compounds, N,N-di($C_1$-$C_4$)alkyl-2,6-di($C_1$-$C_4$)alkylpyrrolidinium compounds, N,N-di($C_1$-$C_4$)alkyl-2,6-di($C_1$-$C_4$)alkylpiperidinium compounds, N,N-di($C_1$-$C_4$)alkyl-2,6-di($C_1$-$C_4$)alkylhexahydroazepinium compounds, and mixtures of two or more thereof, it is preferred that the N,N-dialkyl-2,6-dialkylpyrrolidinium compounds, N,N-dialkyl-2,6-dialkylpiperidinium compounds, and/or N,N-dialkyl-2,6-dialkylhexahydroazepinium compounds display the cis configuration, the trans configuration, or contain a mixture of the cis and trans isomers, wherein preferably the N,N-dialkyl-2,6-dialkylpyrrolidinium compounds, N,N-dialkyl-2,6-dialkylpiperidinium compounds, and/or N,N-dialkyl-2,6-dialkylhexahydroazepinium compounds display the cis configuration, wherein more preferably the one or more tetraalkylammonium cation $R^1R^2R^3R^4N^+$-containing compounds comprise one or more ammonium compounds selected from the group consisting of derivatized or underivatized, preferably underivatized N,Abdi($C_1$-$C_2$)alkyl-cis-2,6-di($C_1$-$C_2$)alkylpiperidinium compounds, and mixtures of two or more thereof, wherein more preferably the one or more tetraalkylammonium cation $R^1R^2R^3R^4N^+$-containing compounds comprise one or more N,N-diethyl-cis-2,6-dimethylpiperidinium compounds.

Further in the case where the one or more structure directing agents comprises one or more tetraalkylammonium cation-containing compounds, it is preferred that the one or more tetraalkylammonium cation-containing compounds are salts, more preferably one or more salts selected from the group consisting of halides, sulfate, nitrate, acetate, and mixtures of two or more thereof, more preferably from the group consisting of bromide, chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or bromides, and more preferably tetraalkylammonium hydroxides.

In the case where the zeolitic material comprised in the seed crystals in (1) is obtained by a process comprising:
(A) preparing a mixture comprising one or more structure directing agents and a first zeolitic material comprising $SiO_2$ and $X_2O_3$ in its framework structure, wherein the first zeolitic material has an FAU-, FER-, TON-, MTT-, BEA-, and/or MFI-type framework structure, and preferably has an FAU-type framework structure;
(B) heating the mixture obtained in (A) for obtaining a second zeolitic material comprising $SiO_2$ and $X_2O_3$ in its framework structure, wherein the second zeolitic material has a CHA-type framework structure,
it is preferred that the molar ratio $H_2O:SiO_2$ of water to $SiO_2$ in the framework structure of the first zeolitic material in the mixture prepared in (A) ranges from 1 to 50, more preferably from 3 to 30, more preferably from 5 to 25, more preferably from 6 to 20, more preferably from 7 to 15, more preferably from 8 to 12, and more preferably from 9 to 11.

In the case where the one or more structure directing agents comprises one or more tetraalkylammonium cation-containing compounds, it is preferred that the mixture prepared in (A) and heated in (B) displays a molar ratio of the one or more tetraalkylammonium cations to $SiO_2$ in the framework structure of the first zeolitic material in the range of from 0.01 to 1.5, more preferably from 0.03 to 1, more preferably from 0.05 to 0.8, more preferably from 0.08 to 0.5, more preferably from 0.1 to 0.4, more preferably from 0.12 to 0.35, more preferably from 0.14 to 0.3, more preferably from 0.16 to 0.25, and more preferably from 0.18 to 0.22.

Further in the case where the zeolitic material comprised in the seed crystals in (1) is obtained by a process comprising:
(A) preparing a mixture comprising one or more structure directing agents and a first zeolitic material comprising $SiO_2$ and $X_2O_3$ in its framework structure, wherein the first zeolitic material has an FAU-, FER-, TON-, MTT-, BEA-, and/or MFI-type framework structure, and preferably has an FAU-type framework structure;
(B) heating the mixture obtained in (A) for obtaining a second zeolitic material comprising $SiO_2$ and $X_2O_3$ in its framework structure, wherein the second zeolitic material has a CHA-type framework structure,
it is preferred that independently from one another, the framework structure of the first zeolitic material displays a $SiO_2:X_2O_3$ molar ratio ranging from 3 to 80, more preferably from 5 to 50, more preferably from 7 to 30, more preferably from 9 to 20, more preferably from 10 to 15, and more preferably from 11 to 13.

Further in the case where the zeolitic material comprised in the seed crystals in (1) is obtained by a process comprising (A) and (B), each as disclosed herein, it is preferred that the mixture prepared in (A) and heated in (B) further comprises at least one source for $OH^-$, wherein the mixture displays an $OH^-:SiO_2$ molar ratio of hydroxide to $SiO_2$ in the framework structure of the first zeolitic material in the range of from 0.005 to 1, more preferably from 0.01 to 0.5, more preferably from 0.03 to 0.3, more preferably from 0.05 to 0.2, more preferably from 0.07 to 0.15, more preferably from 0.08 to 0.13, and more preferably from 0.09 to 0.11.

Further in the case where the zeolitic material comprised in the seed crystals in (1) is obtained by a process comprising (A) and (B), each as disclosed herein, it is preferred that the heating in (B) is conducted at a temperature ranging from 80 to 250° C., more preferably from 100 to 230° C., more preferably from 110 to 210° C., more preferably from 120 to 200° C., more preferably from 125 to 190° C., more preferably from 130 to 180° C., more preferably from 135 to 170° C., more preferably from 140 to 160° C., and more preferably from 145 to 155° C.

Further in the case where the zeolitic material comprised in the seed crystals in (1) is obtained by a process comprising (A) and (B), each as disclosed herein, it is preferred that the heating in (B) is conducted for a period in the range of from 3 h to 12 d, more preferably from 6 h to 8 d, more preferably from 12 h to 5 d, more preferably from 18 h to 4 d, more preferably from 1 d to 3.5 d, and more preferably from 1.5 d to 2.5 d.

Further in the case where the zeolitic material comprised in the seed crystals in (1) is obtained by a process comprising (A) and (B), each as disclosed herein, it is preferred that the heating in (B) is conducted under autogenous pressure, more preferably under solvothermal conditions, more preferably under hydrothermal conditions, wherein preferably heating in (B) is performed in a pressure tight vessel, preferably in an autoclave.

Further in the case where the zeolitic material comprised in the seed crystals in (1) is obtained by a process comprising (A) and (B), each as disclosed herein, it is preferred that after obtaining a second zeolitic material in (B) the process further comprises one or more of:
(B.1) isolating the zeolitic material obtained in (B), preferably by filtration, and/or
(B.2) washing the zeolitic material obtained in (B) or (B.1), and/or
(B.3) drying the zeolitic material obtained in any of (B), (B.1), or (B.2), and/or
(B.4) calcining the second zeolitic material obtained in any of (B), (B.1), (B.2), or (B.3),
wherein the steps (B.1) and/or (B.2) and/or (B.3) can be conducted in any order, and
wherein one or more of said steps is preferably repeated one or more times.

Further in the case where the zeolitic material comprised in the seed crystals in (1) is obtained by a process comprising (A) and (B), each as disclosed herein, it is preferred that the process further comprises (B.4) calcining the second zeolitic material obtained in (B).

Further in the case where the zeolitic material comprised in the seed crystals in (1) is obtained by a process comprising (A) and (B), each as disclosed herein, it is preferred that the mixture prepared in (A) and heated in (B) does not contain any other zeolitic material than the first zeolitic material having an FAU-, FER-, TON-, MTT-, BEA-, and/or MFI-type framework structure, and more preferably does not contain any other zeolitic material than the first zeolitic material preferably having an FAU-type framework structure, wherein more preferably the mixture prepared in (A) and heated in (B) does not contain any seed crystals.

It is preferred that the $SiO_2:X_2O_3$ molar ratio of the mixture prepared in (1) ranges from 1 to 150, more preferably from 2 to 100, more preferably from 5 to 70, more preferably from 10 to 50, more preferably from 13 to 30, more preferably from 16 to 25, and even more preferably from 18 to 22.

It is preferred that the mixture prepared in (1) comprises one or more alkali metals M, wherein the one or more alkali metals M are preferably selected from the group consisting of Li, Na, K, and combinations of two or more thereof, wherein more preferably the one or more alkali metals are K and/or Na, and preferably K and Na.

In the case where the mixture prepared in (1) comprises one or more alkali metals M, it is preferred that the mixture prepared in (1) comprises K and Na, and wherein the Na:K molar ratio of sodium to potassium in the mixture prepared in (1) ranges from 0.1 to 500, more preferably from 0.5 to 200, more preferably from 1 to 100, more preferably from 2 to 50, more preferably from 3 to 20, more preferably from 4 to 10, more preferably from 5 to 7, and more preferably from 5.5 to 6.5.

Further in the case where the mixture prepared in (1) comprises one or more alkali metals M, it is preferred that the $M_2O:SiO_2$ molar ratio in the mixture according to (1) ranges from 0.01 to 5, more preferably from 0.05 to 2, more preferably from 0.1 to 1.5, more preferably from 0.3 to 1.2, more preferably from 0.5 to 1, and even more preferably from 0.6 to 0.8.

Further in the case where the mixture prepared in (1) comprises one or more alkali metals M, it is preferred that M comprises Na, and wherein the $M_2O:SiO_2$ molar ratio in the mixture according to (1) ranges from 0.01 to 5, more preferably from 0.05 to 2, more preferably from 0.1 to 1.5, more preferably from 0.3 to 1, more preferably from 0.4 to 0.5, and even more preferably from 0.5 to 0.7.

Further in the case where the mixture prepared in (1) comprises one or more alkali metals M, it is preferred that M comprises K, and wherein the $M_2O:SiO_2$ molar ratio in the mixture according to (1) ranges from 0.005 to 1, more preferably from 0.01 to 0.5, more preferably from 0.03 to 0.3, more preferably from 0.05 to 0.2, more preferably from 0.07 to 0.15, more preferably from 0.08 to 0.13, and more preferably from 0.09 to 0.11.

It is preferred that the one or more sources for $SO_2$ comprises one or more compounds selected from the group consisting of silicas, silicates, and mixtures thereof, preferably from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, tetraalkoxysilanes, and mixtures of two or more thereof, more preferably from the group consisting of fumed silica, silica hydrosols, silica gel, silicic acid, water glass, colloidal silica, pyrogenic silica, silicic acid esters, tetraalkoxysilanes, and mixtures of two or more thereof, more preferably from the group consisting of fumed silica, silica gel, colloidal silica, pyrogenic silica, and mixtures of two or more thereof, wherein more preferably the one or more sources for $SiO_2$ comprises fumed silica, wherein more preferably the one or more sources for $SiO_2$ is fumed silica.

Further in the case where the zeolitic material comprised in the seed crystals in (1) is obtained by a process comprising (A) and (B), each as disclosed herein, it is preferred that X comprised as $X_2O_3$ in the framework structure of the first zeolitic material
and/or, preferably and,
wherein X provided as the one or more sources for $X_2O_3$ in (1) is, independently from one another, selected from the group consisting of Al, B, In, Ga, and mixtures of two or more thereof, X more preferably being Al and/or B, and more preferably being Al.

It is preferred that the one or more sources for $X_2O_3$ comprises one or more compounds selected from the group consisting of $Al_2O_3$, $Al(OH)_3$, aluminates, aluminum alcoholates, and mixtures of two or more thereof, more preferably from the group consisting of $Al(OH)_3$, alkali metal aluminates, alkaline earth metal aluminates, aluminum (C1-C4)alcoholates, and mixtures of two or more thereof, more preferably from the group consisting of $Al(OH)_3$, sodium aluminate, aluminum (C2-C3)alcoholates, and mixtures of two or more thereof, more preferably from the group consisting of $Al(OH)_3$, sodium aluminate, aluminum (C3)alcoholates, and mixtures of two or more thereof, wherein more preferably the one or more sources for $X_2O_3$ comprises aluminum triisopropylate, wherein more preferably the one or more sources for $X_2O_3$ is aluminum triisopropylate.

As regards the amount of seed crystals in the mixture prepared in (1), no particular restriction applies. It is preferred that the amount of seed crystals in the mixture prepared in (1) ranges from 0.5 to 35 wt.-% based on 100 wt.-% of $SiO_2$ in the one or more sources for $SiO_2$, preferably from 1 to 30 wt.-%, more preferably from 5 to 28 wt.-%, more preferably from 10 to 26 wt.-%, more preferably from 15 to 24 wt.-%, and even more preferably from 18 to 22 wt.-%, wherein preferably the seed crystals consist of the second zeolitic material obtained in (B).

It is preferred that the mixture prepared in (1) further comprises one or more solvents, wherein said one or more solvents preferably comprises water, more preferably distilled water.

In the case where the mixture prepared in (1) further comprises one or more solvents, it is preferred that the mixture prepared in (1) further comprises water as a solvent. It is particularly preferred that the mixture prepared in (1) further comprises water as a solvent and that the $H_2O:SiO_2$ molar ratio of the mixture prepared in (1) ranges from 5 to 250, more preferably from 10 to 200, more preferably from 30 to 180, more preferably from 50 to 150, more preferably from 80 to 120, and even more preferably from 90 to 110.

It is preferred that the heating in (2) is conducted under solvothermal conditions, more preferably under hydrothermal conditions.

It is preferred that in (2) heating of the mixture is conducted at a temperature ranging from 80 to 250° C., more preferably from 110 to 220° C., more preferably from 130 to 200° C., more preferably from 150 to 190° C., and even more preferably from 160 to 180° C.

It is preferred that in (2) heating of the mixture is conducted for a period ranging from 6 h to 6 d, more preferably from 12 h to 4 d, more preferably from 24 h to 3 d, and even more preferably from 1.5 to 2.5 d.

The process of the present invention may comprise further process steps. It is preferred that after obtaining a zeolitic material in (2) the process further comprises one or more of:
(2a) isolating the zeolitic material obtained in (2), preferably by filtration,
and/or
(2b) washing the zeolitic material obtained in (2) or (2a), and/or
(2c) drying the zeolitic material obtained in (2), (2a), or (2b), wherein the steps (2a) and/or (2b) and/or (2c) can be conducted in any order. In this regard, it is particularly preferred that one or more of (2a), (2b), and (2c) is preferably repeated one or more times.

It is preferred that the process of the present invention further comprises
(3) subjecting the zeolitic material obtained in (2), (2a), (2b), or (2c) to an ion-exchange procedure, wherein preferably one or more ionic extra-framework elements contained in the zeolite framework is ion-exchanged against $H^+$ and/or $NH_4^+$, more preferably against $NH_4^+$.

It is preferred that the process of the present invention further comprises
(4) subjecting the zeolitic material obtained in (2), (2a), (2b), (2c), or (3) to an ion-exchange procedure, wherein preferably one or more ionic extra-framework elements contained in the zeolite framework is ion-exchanged against one or more metal cations selected from the group consisting of Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of Sr, Cr, Mo, Fe, Co, Ni, Cu, Zn, Ag, and mixtures of two or more thereof, more preferably from the group consisting of Cr, Mg, Mo, Fe, Ni, Cu, Zn, Ag, and mixtures of two or more thereof, more preferably from the group consisting of Mg, Mo, Fe, Ni, Cu, Zn, Ag, and mixtures of two or more thereof, wherein more preferably the one or more metal contions comprise Cu and/or Fe, preferably Cu, wherein even more preferably the one or more metal cations consist of Cu and/or Fe, preferably of Cu; wherein the one or more ionic extra-framework elements preferably comprise $NH_4^+$, $H^+$, and/or an alkali metal, the alkali metal preferably being selected from the group consisting of Li, Na, K, Cs, and combinations of two or more thereof, wherein more preferably the one or more ionic extra-framework elements comprise one or more metal cations and/or cationic elements selected from the group consisting of $NH_4^+$, $H^+$, Li, Na, K, and combinations of two or more thereof, more preferably from the group consisting of $H^+$, Na, K, and combinations of two or more thereof, wherein more preferably the one or more ionic extra-framework elements comprise $H^+$, wherein even more preferably the one or more ionic extra-framework elements consists of $H^+$.

As outlined herein, the process of the present invention may comprise further process steps. It is preferred that the process further comprises
(5) calcining the zeolitic material obtained in (2), (2a), (2b), (2c), (3), or (4).

In the case where the process as disclosed herein after obtaining a second zeolitic material in (B) further comprises (B.4) and/or (5), each as disclosed herein, it is preferred that the temperature of calcination in (B.4) and/or (5) is in the range of from 300 to 900° C., more preferably of from 400 to 700° C., more preferably of from 450 to 650° C., and more preferably of from 500 to 600° C.

Depending on the mass of the zeolitic material to be calcined, the duration of calcining should be adjusted. Thus, further in the case where the process as disclosed herein after obtaining a second zeolitic material in (B) further comprises (B.4) and/or (5), each as disclosed herein, it is preferred that calcining in (B.4) and/or (5) is conducted for a period in the range of from 0.5 to 24 h, more preferably from 1 to 15 h, more preferably from 2 to 12 h, more preferably from 2.5 to 9 h, more preferably from 3 to 7 h, more preferably from 3.5 to 6.5 h, more preferably from 4 to 6 h, and more preferably from 4.5 to 5.5 h.

In the case where the process of the present invention further comprises one or more of (2a), (2b), (2c), (3), (4), and (5), it is preferred that the process yet further comprises
(R) subjecting the zeolitic material obtained in (2a), (2b), (2c), (3), (4), or (5) to a procedure for removing at least a portion of X, preferably tetrahedrally coordinated X, from the framework structure of the zeolitic material.

It is preferred that neither during nor after (1) and prior to (2), (2a), (2b), (2c), (3), (4), (5), or (R) does the organotemplate-free synthetic process comprise a calcination procedure. It is thus preferred that the process of the present invention is organotemplate-free.

It is preferred that the procedure in (R) for removing at least a portion of X from the framework structure of the zeolitic material comprises one or more steam-treatment steps (S).

In the case where the procedure in (R) for removing at least a portion of X from the framework structure of the zeolitic material comprises one or more steam-treatment steps (S), it is preferred that the one or more steam-treatment steps (S) are conducted at a temperature of from 200 to 1,000° C., more preferably of from 300 to 900° C., preferably of from 400 to 800° C., preferably of from 500 to 700° C., and even more preferably of from 550 to 650° C.

Further in the case where the procedure in (R) for removing at least a portion of X from the framework structure of the zeolitic material comprises one or more steam-treatment steps (S), it is preferred that the one or more steam-treatment steps (S) are conducted for a duration of from 0.1 to 48 h, more preferably of from 0.2 to 24 h, more preferably of from 0.3 to 12 h, more preferably from 0.35 to 6 h, more preferably of from 0.4 to 4 h, more preferably of from 0.45 to 2 h, and even more preferably of from 0.5 to 1.5 h.

Further in the case where the procedure in (R) for removing at least a portion of X from the framework structure of the zeolitic material comprises one or more steam-treatment steps (S), it is preferred that the one or more steam-treatment steps (S) are conducted using a steam concentration of from 5 to 95 vol.-%, preferably of from 10 to 90 vol.-%, and more preferably of from 20 to 80 vol.-%, and more preferably of from 30 to 70 vol.-%, and more preferably of from 40 to 60 vol.-%, and more preferably of from 45 to 55 vol.-%, wherein the remaining volume is preferably an inert gas, more preferably nitrogen.

Furthermore, the present invention relates to a synthetic zeolitic material comprising one or more zeolite intergrowth phases of one or more zeolites having a CHA-type framework structure and one or more zeolites having an AFT-type framework structure, wherein the zeolitic material is obtainable and/or obtained according to the process of any one of the embodiments as disclosed herein.

Yet further, the present invention relates to a synthetic zeolitic material, preferably obtainable and/or obtained according to the process of any one of the embodiments as disclosed herein, comprising one or more zeolite intergrowth phases of one or more zeolites having a CHA-type framework structure comprising $SiO_2$ and $X_2O_3$, and one or more zeolites having an AFT-type framework structure comprising $SiO_2$ and $X_2O_3$, wherein X is a trivalent element, and wherein in the CO FT-IR spectrum of the zeolitic material measured in the wavenumber range of from 3,000 to 3,800 $cm^{-1}$ at a pressure of 1,000 Pa, the absorbance band with the highest negative absorbance displays its minimum in the range of from 3,580 to 3,700 $cm^{-1}$, preferably from 3,600 to 3,680 $cm^{-1}$, more preferably from 3,620 to 3,670 $cm^{-1}$, more preferably from 3,630 to 3,660 $cm^{-1}$, and more preferably from 3,640 to 3,650 $cm^{-1}$, and the absorbance band with the highest positive absorbance displays its maximum in the range of from 3,350 to 3,560 $cm^{-1}$, preferably from 3,370 to 3,540 $cm^{-1}$, more preferably from 3,390 to 3,520 $cm^{-1}$, more preferably from 3,410 to 3,500 $cm^{-1}$, more preferably from 3,430 to 3,480 $cm^{-1}$, and more preferably from 3,450 to 3,460 $cm^{-1}$.

It is preferred that the zeolitic material comprises COE-10, wherein more preferably the synthetic zeolitic material is COE-10.

It is preferred that the framework of the zeolitic material contains substantially no phosphorous, wherein preferably the zeolitic material contains substantially no phosphorous or phosphorous containing compounds. It is particularly preferred that the framework of the zeolitic material, more preferably the zeolitic material, comprises 1 wt.-% or less of phosphorous, calculated as element and based on the total weight of the zeolitic material, preferably 0.5 wt.-% or less, more preferably 0.1 wt.-% or less, more preferably 0.05 wt.-% or less, more preferably 0.01 wt.-% or less, more preferably 0.005 wt.-% or less, and more preferably 0.001 wt.-% or less.

It is preferred that X is selected from the group consisting of Al, B, In, Ga, and mixtures of two or more thereof, X more preferably being Al and/or B, and more preferably being Al.

It is preferred that one or more zeolites having a CHA-type framework structure comprising $SiO_2$ and $X_2O_3$ are selected from the group consisting of Willhendersonite, ZYT-6, SAPO-47, Na-Chabazite, Chabazite, LZ-218, Linde D, Linde R, SAPO-34, ZK-14, K-Chabazite, MeAPS0-47, Phi, DAF-5, UiO-21, |Li—Na| [Al—Si—O]—CHA, (Ni(deta)2)-UT-6, SSZ-13, and SSZ-62, including mixtures of two or more thereof, more preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof, more preferably from the group consisting of Chabazite, Linde D, Linde R, SAPO-34, SSZ-13, and SSZ-62, including mixtures of two or more thereof, more preferably from the group consisting of Chabazite, SSZ-13, and SSZ-62, including mixtures of two or three thereof, wherein more preferably the one or more zeolites having a CHA-type framework structure comprises chabazite and/or SSZ-13, preferably SSZ-13, and wherein more preferably the one or more zeolites having a CHA-type framework structure is chabazite and/or SSZ-13, preferably SSZ-13.

It is preferred that the $SiO_2:X_2O_3$ molar ratio of the zeolitic material ranges from 2 to 50, more preferably from 3 to 30, more preferably from 4 to 20, more preferably from 5 to 15, more preferably from 6 to 12, more preferably from 6.5 to 9, more preferably from 7 to 8, and more preferably from 7.2 to 7.6.

It is preferred that the framework structure of the one or more zeolite intergrowth phases comprises AABBCC and AACCBB crystallographic stacking sequences of 6 crystallographic layers, respectively, along the crystallographic c-axis, wherein the portion of the total number of crystallographic layers consisting of AABBCC and AACCBB crystallographic stacking sequences along the crystallographic c-axis in the framework structure of the one or more zeolite intergrowth phases, which consists of AABBC-CAACCBB crystallographic stacking sequences of 12 layers ranges from 10 to 90%±5%, preferably from 20 to 80%±5%, more preferably from 30 to 70%±5%, more preferably from 35 to 65%±5%, more preferably from 40 to 60%±5%, more preferably from 44 to 56%±5%, more preferably from 46 to 54%±5%, more preferably from 48 to 52%±5%, and more preferably from 49 to 50%±5%. It is particularly preferred that the portion of the total number of crystallographic layers consisting of AABBCC and AAC-CBB crystallographic stacking sequences along the crystallographic c-axis in the framework structure of the one or more zeolite intergrowth phases, which consists of AABBC-CAACCBB crystallographic stacking sequences of 12 layers, is determined by the method described in Example 3 of the experimental section.

It is preferred that the BET surface area determined according to ISO 9277:2010 of the zeolitic material ranges from 200 to 850 $m^2/g$, more preferably from 400 to 800 $m^2/g$, more preferably from 500 to 750 $m^2/g$, more preferably from 600 to 700 $m^2/g$, and even more preferably from 625 to 675 $m^2/g$.

It is preferred that the total pore volume determined according to ISO 15901-3:2007 of the zeolitic material ranges from 0.2 to 90 $cm^3/g$, more preferably from 0.3 to 75 $cm^3/g$, more preferably from 0.35 to 70 $cm^3/g$, more preferably from 0.4 to 66 $cm^3/g$, more preferably from 0.42 to 64 $cm^3/g$, more preferably from 0.44 to 62 $cm^3/g$, more preferably from 0.46 to 60 $cm^3/g$, more preferably from 0.48 to 58 $cm^3/g$ more preferably from 0.5 to 56 $cm^3/g$, and more preferably from 0.52 to 0.54 $cm^3/g$.

It is preferred that the mesopore volume determined according to ISO 15901-3:2007 of the zeolitic material ranges from 0.1 to 0.6 $cm^3/g$, more preferably from 0.15 to 0.5 $cm^3/g$, more preferably from 0.2 to 0.45 $cm^3/g$, more preferably from 0.22 to 0.4 $cm^3/g$, more preferably from 0.24 to 0.38 $cm^3/g$, more preferably from 0.26 to 0.36 $cm^3/g$, more preferably from 0.28 to 0.34 $cm^3/g$, and more preferably from 0.3 to 0.32 $cm^3/g$.

It is preferred that the deconvoluted spectrum of the temperature programmed desorption of ammonia ($NH_3$-TPD) obtained for the zeolitic material displays a maximum in the temperature range of from 150 to 175° C., more preferably from 152 to 173° C., more preferably from 154 to 171° C., more preferably from 156 to 169° C., more preferably from 158 to 167° C., more preferably from 160 to 165° C., and more preferably from 161 to 163° C., wherein the area of the deconvoluted peak for said maximum corresponds to an amount of acid sites in the range of from 0.01 to 1.0 mmol/g, preferably from 0.03 to 0.8 mmol/g, more preferably from 0.05 to 0.6 mmol/g, more preferably from 0.07 to 0.5 mmol/g, more preferably from 0.09 to 0.45 mmol/g, more preferably from 0.11 to 0.4 mmol/g, more preferably from 0.13 to 0.35 mmol/g, more preferably from 0.15 to 0.3 mmol/g, more preferably from 0.17 to 0.27 mmol/g, more preferably from 0.19 to 0.25 mmol/g, and more preferably from 0.21 to 0.23 mmol/g.

It is preferred that the deconvoluted spectrum of the temperature programmed desorption of ammonia ($NH_3$-TPD) obtained for the zeolitic material displays a maximum in the temperature range of from 170 to 220° C., more preferably from 175 to 215° C., more preferably from 180 to 212° C., more preferably from 183 to 209° C., more preferably from 185 to 207° C., more preferably from 187 to 205° C., more preferably from 189 to 203° C., more preferably from 191 to 201° C., more preferably from 193 to 199° C., and more preferably from 195 to 197° C., wherein the area of the deconvoluted peak for said maximum corresponds to an amount of acid sites in the range of from 0.01 to 0.7 mmol/g, preferably from 0.05 to 0.6 mmol/g, more preferably from 0.1 to 0.55 mmol/g, more preferably from 0.15 to 0.5 mmol/g, more preferably from 0.2 to 0.49 mmol/g, more preferably from 0.25 to 0.47 mmol/g, more preferably from 0.3 to 0.45 mmol/g, more preferably from 0.35 to 0.43 mmol/g, more preferably from 0.37 to 0.41 mmol/g, and more preferably from 0.39 to 0.4 mmol/g.

It is preferred that the deconvoluted spectrum of the temperature programmed desorption of ammonia ($NH_3$-TPD) obtained for the zeolitic material displays a maximum in the temperature range of from 180 to 300° C., more preferably from 210 to 290° C., more preferably from 230 to 285° C., more preferably from 240 to 280° C., more preferably from 245 to 277° C., more preferably from 250 to 275° C., more preferably from 255 to 273° C., more preferably from 260 to 271° C., more preferably from 263 to 269° C., and more preferably from 265 to 267° C., wherein the area of the deconvoluted peak for said maximum corresponds to an amount of acid sites in the range of from 0.1 to 0.7 mmol/g, preferably from 0.15 to 0.68 mmol/g, more preferably from 0.2 to 0.64 mmol/g, more preferably from 0.25 to 0.62 mmol/g, more preferably from 0.3 to 0.6 mmol/g, more preferably from 0.35 to 0.58 mmol/g, more preferably from 0.4 to 0.56 mmol/g, more preferably from 0.45 to 0.54 mmol/g, more preferably from 0.47 to 0.52 mmol/g, and more preferably from 0.49 to 0.5 mmol/g.

Yet further, the present invention relates to a use of a synthetic zeolitic material according to any one of the embodiments as disclosed herein as a molecular sieve, as an adsorbent, for ionexchange, or as a catalyst and/or as a catalyst support, preferably as a catalyst for the selective catalytic reduction (SCR) of nitrogen oxides $NO_x$; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_x$, and more preferably for the selective catalytic reduction (SCR) of nitrogen oxides $NO_x$ in exhaust gas from a combustion engine, preferably from a diesel engine or from a lean burn gasoline engine, wherein more preferably the zeolitic material in the conversion of alcohols to olefins, and more preferably in methanol to olefin (MTO) catalysis.

The unit bar(abs) refers to an absolute pressure of $10^5$ Pa.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4". Further, it is explicitly noted that the following set of embodiments is not the set of claims determining the extent of protection, but represents a suitably structured part of the description directed to general and preferred aspects of the present invention.

1. A process for the production of a zeolitic material comprising one or more zeolite intergrowth phases of one or more zeolites having a CHA-type framework structure comprising $SiO_2$ and $X_2O_3$, and one or more zeolites having an AFT-type framework structure comprising $SiO_2$ and $X_2O_3$, wherein X is a trivalent element, and wherein said process comprises:
   (1) preparing a mixture comprising one or more sources for $SiO_2$, one or more sources for $X_2O_3$, and seed crystals comprising a zeolitic material, said zeolitic material comprising $SiO_2$ and $X_2O_3$ in its framework structure and having a CHA-type framework structure;
   (2) heating the mixture prepared in (1) for obtaining a zeolitic material comprising one or more zeolite intergrowth phases of one or more zeolites having a CHA framework structure and one or more zeolites having an AFT-type framework structure; and
   (R) subjecting the zeolitic material obtained in (2) to a procedure for removing at least a portion of X, preferably tetrahedrally coordinated X, from the framework structure of the zeolitic material.

2. The process of embodiment 1, wherein the zeolitic material obtained in (2) comprising one or more zeolite intergrowth phases of one or more zeolites having a CHA framework structure and one or more zeolites having an AFT-type framework structure, comprises COE-10, wherein preferably the zeolitic material obtained in (2) is COE-10.

3. The process of embodiment 1 or 2, wherein the zeolitic material comprised in the seed crystals in (1) is obtained by a process comprising:
   (A) preparing a mixture comprising one or more structure directing agents and a first zeolitic material comprising $SiO_2$ and $X_2O_3$ in its framework structure, wherein the first zeolitic material has an FAU-, FER-, TON-, MTT-, BEA-, and/or MFI-type framework structure, and preferably has an FAU-type framework structure;
   (B) heating the mixture obtained in (A) for obtaining a second zeolitic material comprising $SiO_2$ and $X_2O_3$ in its framework structure, wherein the second zeolitic material has a CHA-type framework structure.

4. The process of embodiment 3, wherein the first zeolitic material having an FAU-type framework structure comprises one or more zeolites having an FAU-type framework structure, wherein the one or more zeolites having an FAU-type framework structure are selected from the group consisting of Li-LSX, zeolite X, zeolite Y, ECR-30, ZSM-20, LZ-210, SAPO-37, US-Y, CSZ-1, ZSM-3, Faujasite, and mixtures of two or more thereof,
   preferably from the group consisting of zeolite X, zeolite Y, ECR-30, ZSM-20, LZ-210, USY, CSZ-1, ZSM-3, Faujasite, and mixtures of two or more thereof,
   more preferably from the group consisting of zeolite X, zeolite Y, ZSM-20, ZSM-3, Faujasite, and mixtures of two or more thereof, more preferably from the group consisting of zeolite X, zeolite Y, Faujasite, and mixtures of two or more thereof, wherein more preferably the one or more zeolites having an FAU-type framework structure comprise zeolite X and/or zeolite Y, preferably zeolite Y, wherein more preferably the one or more zeolites having an FAU-type framework structure is zeolite X and/or zeolite Y, preferably zeolite Y.

5. The process of any one of embodiments 1 to 4, wherein the mixture prepared in (1) and heated in (2) contains substantially no organotemplate.

6. The process of any one of embodiments 3 to 5, wherein the mixture prepared in (A) and heated in (B) contains substantially no phosphorous and/or phosphorous containing compounds.

7. The process of any one of embodiments 3 to 6, wherein the framework of the zeolitic material obtained in (B) contains substantially no phosphorous, wherein preferably the zeolitic material obtained in (B) contains substantially no phosphorous and/or phosphorous containing compounds.

8. The process of any one of embodiments 1 to 7, wherein the mixture prepared in (1) and heated in (2) contains substantially no phosphorous and/or phosphorous containing compounds.

9. The process of any one of embodiments 1 to 8, wherein the framework of the zeolitic material obtained in (2) contains substantially no phosphorous, wherein preferably the zeolitic material obtained in (2) contains substantially no phosphorous and/or phosphorous containing compounds.

10. The process of any one of embodiments 3 to 9, wherein the mixture prepared according to (A) further comprises one or more solvents, wherein said one or more solvents preferably comprises water, preferably distilled water, wherein more preferably water is contained as the one or more solvents in the mixture prepared according to (A), preferably distilled water.

11. The process of any one of embodiments 3 to 10, wherein the mixture prepared in (A) and heated in (B) further comprises at least one source for $OH^-$, wherein said at least one source for $OH^-$ preferably comprises a metal hydroxide, more preferably a hydroxide of an alkali metal M, more preferably sodium and/or potassium hydroxide, and more preferably sodium hydroxide, wherein more preferably the at least one source for $OH^-$ is sodium hydroxide.

12. The process of any one of embodiments 3 to 11, wherein the second zeolitic material having a CHA-type framework structure comprises one or more zeolites having a CHA-type framework structure, wherein the one or more zeolites having a CHA-type framework structure are selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li—Na| [Al—Si—O]-CHA, (Ni(deta)2)-UT-6, SSZ-13, and SSZ-62, including mixtures of two or more thereof, preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof, more preferably from the group consisting of Chabazite, Linde D, Linde R, SAPO-34, SSZ-13, and SSZ-62, including mixtures of two or more thereof, more preferably from the group consisting of Chabazite, SSZ-13, and SSZ-62, including mixtures of two or three thereof, wherein more preferably the second zeolitic material obtained in (B) comprises chabazite and/or SSZ-13, preferably SSZ-13, and wherein more preferably the second zeolitic material obtained in (B) is chabazite and/or SSZ-13, preferably SSZ-13.

13. The process of any one of embodiments 3 to 12, wherein the one or more structure directing agents comprises one or more tetraalkylammonium cation-containing compounds.

14. The process of embodiment 13, wherein the one or more tetraalkylammonium cation-containing compounds comprise one or more compounds selected from the group consisting of 1-adamantyltri($C_1$-$C_3$)alkylammonium compounds, N,N,N-trimethyl-N-benzylammonium compounds, and mixtures of two or more thereof, preferably from the group consisting of 1-adamantyltri($C_1$-$C_2$)alkylammonium compounds and mixtures of two or more thereof, more preferably from the group consisting of 1-adamantyltriethylammonium compounds, 1-adamantyldiethylmethylalkylammonium compounds, 1-adamantylethyldimethyl-ammonium compounds, 1-adamantyltrimethylammonium compounds, and mixtures of two or more thereof, wherein more preferably the one or more tetraalkylammonium cation-containing compounds comprise one or more 1-adamantyltrimethylammonium compounds, wherein more preferably the one or more tetraalkylammonium cation-containing compounds consist of one or more 1-adamantyltrimethylammonium compounds.

15. The process of embodiment 13 or 14, wherein the one or more tetraalkylammonium cation-containing compounds comprise one or more compounds selected from the group consisting of N,N,N-tri($C_1$-$C_2$)alkyl-($C_6$-$C_6$)cycloalkylammonium compounds and mixtures of two or more thereof, preferably from the group consisting of N,N,N-tri($C_1$-$C_2$)alkyl-cyclopentylammonium compounds, N,N,N-tri($C_1$-$C_2$)alkyl-cyclohexylammonium compounds, and mixtures of two or more thereof, more preferably from the group consisting of N,N,N-triethyl-cyclohexylammonium compounds, N,N-diethyl-N-methyl-cyclohexylammonium compounds, N,N-dimethyl-N-ethyl-cyclohexylammonium compounds, N,N,N-trimethyl-cyclohexylammonium compounds, and mixtures of two or more thereof, wherein more preferably the one or more tetraalkylammonium cation-containing compounds comprise one or more N,N,N-trimethyl-cyclohexylammonium compounds, wherein more preferably the one or more tetraalkylammonium cation-containing compounds consist of one or more N,N,N-trimethyl-cyclohexylammonium compounds.

16. The process of any one of embodiments 13 to 15, wherein the one or more tetraalkylammonium cation-containing compounds comprise one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain.

17. The process of embodiment 16, wherein $R^1$ and $R^2$ independently from one another stand for optionally substituted and/or optionally branched ($C_1$-$C_6$)alkyl, preferably (C₁-C₆)alkyl, more preferably (C₁-C₄)alkyl, more preferably (C₁-C₃)alkyl, and more preferably for optionally substituted methyl or ethyl, wherein more preferably $R^1$ and $R^2$ independently from one another stand for optionally substituted methyl or ethyl, preferably unsubstituted methyl or ethyl, wherein more preferably $R^1$ and $R^2$ independently from one another stand for optionally substituted ethyl, preferably unsubstituted ethyl.

18. The process of embodiment 16 or 17, wherein $R^3$ and $R^4$ form a common derivatized or underivatized, preferably underivatized alkyl chain, preferably a common (C₄-C₈) alkyl chain, more preferably a common (C₄-C₇)alkyl chain, more preferably a common (C₄-C₆)alkyl chain, wherein more preferably said common alkyl chain is a derivatized or underivatized, preferably underivatized C₄ or C₅ alkyl chain, and more preferably a derivatized or underivatized, preferably underivatized C₅ alkyl chain.

19. The process of any one of embodiments 16 to 18, wherein the one or more tetraalkylammonium cation $R^1R^2R^3R^4N^+$-containing compounds comprise one or more compounds selected from the group consisting of N,Abdi(C₁-C4)alkyl-3,5-di(C₁-C₄)alkylpyrrolidinium compounds, N,N-di(C₁-C₄)alkyl-3,5-di(C₁-C₄)alkylpiperidinium compounds, N,N-di(C₁-C₄)alkyl-3,5-di(C₁-C₄) alkylhexahydroazepinium compounds, N,N-di(C₁-C₄)alkyl-2,6-di(C₁-C₄)alkylpyrrolidinium compounds, N,N-di (C₁-C₄)alkyl-2,6-di(C₁-C₄)alkylpiperidinium compounds, N,N-di(C₁-C₄)alkyl-2,6-di(C₁-C₄)alkylhexahydroazepinium compounds, and mixtures of two or more thereof,
preferably from the group consisting of N,N-di(C₁-C₄) alkyl-3,5-di(C₁-C₄)alkylpyrrolidinium compounds, N,N-di(C₁-C₄)alkyl-3,5-di(C₁-C₄)alkylpiperidinium compounds, N,N-di(C₁-C₄)alkyl-3,5-di(C₁-C₄)alkylhexahydroazepinium compounds, N,N-di(C₁-C₄)alkyl-2,6-di(C₁-C₄)alkylpyrrolidinium compounds, N,N-di (C₁-C₄)alkyl-2,6-di(C₁-C₄)alkylpiperidinium compounds, N,N-di(C₁-C₄)alkyl-2,6-di(C₁-C₄)alkylhexahydroazepinium compounds, and mixtures of two or more thereof,
more preferably from the group consisting of N,N-di(C₁-C₃)alkyl-3,5-di(C₁-C₃)alkylpyrrolidinium compounds, N,N-di(C₁-C₃)alkyl-3,5-di(C₁-C₃)alkylpiperidinium compounds, N,N-di(C₁-C₃)alkyl-3,5-di(C₁-C₃)alkylhexahydroazepinium compounds, N,N-di(C₁-C₃)alkyl-2,6-di(C₁-C₃)alkylpyrrolidinium compounds, N,N-di (C₁-C₃)alkyl-2,6-di(C₁-C₃)alkylpiperidinium compounds, N,N-di(C₁-C₃)alkyl-2,6-di(C₁-C₃)alkylhexahydroazepinium compounds, and mixtures of two or more thereof,
more preferably from the group consisting of N,N-di(C₁-C₂)alkyl-3,5-di(C₁-C₂)alkylpyrrolidinium compounds, N,N-di(C₁-C₂)alkyl-3,5-di(C₁-C₂)alkylpiperidinium compounds, N,N-di(C₁-C₂)alkyl-3,5-di(C₁-C₂)alkylhexahydroazepinium compounds, N,N-di(C₁-C₂)alkyl-2,6-di(C₁-C₂)alkylpyrrolidinium compounds, N,N-di (C₁-C₂)alkyl-2,6-di(C₁-C₂)alkylpiperidinium compounds, N,N-di(C₁-C₂)alkyl-2,6-di(C₁-C₂)alkylhexahydroazepinium compounds, and mixtures of two or more thereof,
more preferably from the group consisting of N,N-di(C₁-C₂)alkyl-3,5-di(C₁-C₂)alkylpiperidinium compounds, N,N-di(C₁-C₂)alkyl-2,6-di(C₁-C₂)alkylpiperidinium compounds, and mixtures of two or more thereof,
wherein more preferably the one or more tetraalkylammonium cation $R^1R^2R^3R^4N^+$-containing compounds comprise one or more N,N,N-trimethyl-3,5-dimethylpiperidinium and/or one or more N,N-diethyl-2,6-dimethylpiperidinium compounds, preferably one or more N,N-diethyl-2,6-dimethylpiperidinium compounds
wherein more preferably the one or more tetraalkylammonium cation $R^1R^2R^3R^4N^+$-containing compounds consist of one or more N,N,N-trimethyl-3,5-dimethylpiperidinium and/or one or more N,N-diethyl-2,6-dimethylpiperidinium compounds, preferably one or more N,N-diethyl-2,6-dimethylpiperidinium compounds.

20. The process of embodiment 19, wherein the N,N-dialkyl-2,6-dialkylpyrrolidinium compounds, N,N-dialkyl-2,6-dialkylpiperidinium compounds, and/or N,N-dialkyl-2,6-dialkylhexahydroazepinium compounds display the cis configuration, the trans configuration, or contain a mixture of the cis and trans isomers,
wherein preferably the N,N-dialkyl-2,6-dialkylpyrrolidinium compounds, N,N-dialkyl-2,6-dialkylpiperidinium compounds, and/or N,N-dialkyl-2,6-dialkylhexahydroazepinium compounds display the cis configuration,
wherein more preferably the one or more tetraalkylammonium cation $R^1R^2R^3R^4N^+$-containing compounds comprise one or more ammonium compounds selected from the group consisting of derivatized or underivatized, preferably underivatized N,N-di(C₁-C₂)alkyl-cis-2,6-di(C₁-C₂)alkylpiperidinium compounds, and mixtures of two or more thereof, wherein more preferably the one or more tetraalkylammonium cation $R^1R^2R^3R^4N^+$-containing compounds comprise one or more N,N-diethyl-cis-2,6-dimethylpiperidinium compounds.

21. The process of any one of embodiments 13 to 20, wherein the one or more tetraalkylammonium cation-containing compounds are salts, preferably one or more salts selected from the group consisting of halides, sulfate, nitrate, acetate, and mixtures of two or more thereof, more preferably from the group consisting of bromide, chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or bromides, and more preferably tetraalkylammonium hydroxides.

22. The process of any one of embodiments 3 to 21, wherein the molar ratio $H_2O:SiO_2$ of water to $SiO_2$ in the framework structure of the first zeolitic material in the mixture prepared in (A) ranges from 1 to 50, preferably from 3 to 30, more preferably from 5 to 25, more preferably from 6 to 20, more preferably from 7 to 15, more preferably from 8 to 12, and more preferably from 9 to 11.

23. The process of any one of embodiments 13 to 22, wherein the mixture prepared in (A) and heated in (B) displays a molar ratio of the one or more tetraalkylammonium cations to $SiO_2$ in the framework structure of the first zeolitic material in the range of from 0.01 to 1.5, preferably from 0.03 to 1, more preferably from 0.05 to 0.8, more preferably from 0.08 to 0.5, more preferably from 0.1 to 0.4, more preferably from 0.12 to 0.35, more preferably from 0.14 to 0.3, more preferably from 0.16 to 0.25, and more preferably from 0.18 to 0.22.

24. The process of any one of embodiments 3 to 23, wherein independently from one another, the framework structure of the first zeolitic material displays a $SiO_2:X_2O_3$ molar ratio ranging from 3 to 80, preferably from 5 to 50, more preferably from 7 to 30, more preferably from 9 to 20, more preferably from 10 to 15, and more preferably from 11 to 13.

25. The process of any one of embodiments 3 to 24, wherein the mixture prepared in (A) and heated in (B) further comprises at least one source for OH$^-$, wherein the mixture displays an OH$^-$:SiO$_2$ molar ratio of hydroxide to SiO$_2$ in the framework structure of the first zeolitic material in the range of from 0.005 to 1, preferably from 0.01 to 0.5, more preferably from 0.03 to 0.3, more preferably from 0.05 to 0.2, more preferably from 0.07 to 0.15, more preferably from 0.08 to 0.13, and more preferably from 0.09 to 0.11.

26. The process of any one of embodiments 3 to 25, wherein the heating in (B) is conducted at a temperature ranging from 80 to 250° C., preferably from 100 to 230° C., more preferably from 110 to 210° C., more preferably from 120 to 200° C., more preferably from 125 to 190° C., more preferably from 130 to 180° C., more preferably from 135 to 170° C., more preferably from 140 to 160° C., and more preferably from 145 to 155° C.

27. The process of any one of embodiments 3 to 26, wherein the heating in (B) is conducted fora period in the range of from 3 h to 12 d, preferably from 6 h to 8 d, more preferably from 12 h to 5 d, more preferably from 18 h to 4 d, more preferably from 1 d to 3.5 d, and more preferably from 1.5 d to 2.5 d.

28. The process of any one of embodiments 3 to 27, wherein the heating in (B) is conducted under autogenous pressure, preferably under solvothermal conditions, more preferably under hydrothermal conditions, wherein preferably heating in (B) is performed in a pressure tight vessel, preferably in an autoclave.

29. The process of any one of embodiments 3 to 28, wherein after obtaining a second zeolitic material in (B) the process further comprises one or more of:
(B.1) isolating the zeolitic material obtained in (B), preferably by filtration,
and/or
(B.2) washing the zeolitic material obtained in (B) or (B.1), and/or
(B.3) drying the zeolitic material obtained in any of (B), (B.1), or (B.2),
and/or
(B.4) calcining the second zeolitic material obtained in any of (B), (B.1), (B.2), or (B.3),
wherein the steps (B.1) and/or (B.2) and/or (B.3) can be conducted in any order, and
wherein one or more of said steps is preferably repeated one or more times.

30. The process of any one of embodiments 3 to 29, further comprising
(B.4) calcining the second zeolitic material obtained in (B).

31. The process of any one of embodiments 3 to 30, wherein the mixture prepared in (A) and heated in (B) does not contain any other zeolitic material than the first zeolitic material having an FAU-, FER-, TON-, MTT-, BEA-, and/or MFI-type framework structure, and preferably does not contain any other zeolitic material than the first zeolitic material preferably having an FAU-type framework structure, wherein more preferably the mixture prepared in (A) and heated in (B) does not contain any seed crystals.

32. The process of any one of embodiments 1 to 31, wherein the SiO$_2$:X$_2$O$_3$ molar ratio of the mixture prepared in (1) ranges from 1 to 150, preferably from 2 to 100, more preferably from 5 to 70, more preferably from 10 to 50, more preferably from 13 to 30, more preferably from 16 to 25, and even more preferably from 18 to 22.

33. The process of any one of embodiments 1 to 32, wherein the mixture prepared in (1) comprises one or more alkali metals M, wherein the one or more alkali metals M are preferably selected from the group consisting of Li, Na, K, and combinations of two or more thereof, wherein more preferably the one or more alkali metals are K and/or Na, and preferably K and Na.

34. The process of embodiment 33, wherein the mixture prepared in (1) comprises K and Na, and wherein the Na:K molar ratio of sodium to potassium in the mixture prepared in (1) ranges from 0.1 to 500, preferably from 0.5 to 200, more preferably from 1 to 100, more preferably from 2 to 50, more preferably from 3 to 20, more preferably from 4 to 10, more preferably from 5 to 7, and more preferably from 5.5 to 6.5.

35. The process of embodiment 33 or 34, wherein the M$_2$O:SiO$_2$ molar ratio in the mixture according to (1) ranges from 0.01 to 5, preferably from 0.05 to 2, more preferably from 0.1 to 1.5, more preferably from 0.3 to 1.2, more preferably from 0.5 to 1, and even more preferably from 0.6 to 0.8.

36. The process of any one of embodiments 33 to 35, wherein M comprises Na, and wherein the M$_2$O:SiO$_2$ molar ratio in the mixture according to (1) ranges from 0.01 to 5, preferably from 0.05 to 2, more preferably from 0.1 to 1.5, more preferably from 0.3 to 1, more preferably from 0.4 to 0.5, and even more preferably from 0.5 to 0.7.

37. The process of any one of embodiments 33 to 36, wherein M comprises K, and wherein the M$_2$O:SiO$_2$ molar ratio in the mixture according to (1) ranges from 0.005 to 1, preferably from 0.01 to 0.5, more preferably from 0.03 to 0.3, more preferably from 0.05 to 0.2, more preferably from 0.07 to 0.15, more preferably from 0.08 to 0.13, and more preferably from 0.09 to 0.11.

38. The process of any one of embodiments 1 to 37, wherein the one or more sources for SiO$_2$ comprises one or more compounds selected from the group consisting of silicas, silicates, and mixtures thereof,
preferably from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, tetraalkoxysilanes, and mixtures of two or more thereof,
more preferably from the group consisting of fumed silica, silica hydrosols, silica gel, silicic acid, water glass, colloidal silica, pyrogenic silica, silicic acid esters, tetraalkoxysilanes, and mixtures of two or more thereof,
more preferably from the group consisting of fumed silica, silica gel, colloidal silica, pyrogenic silica, and mixtures of two or more thereof,
wherein more preferably the one or more sources for SiO$_2$ comprises fumed silica, wherein more preferably the one or more sources for SO$_2$ is fumed silica.

39. The process of any one of embodiments 3 to 38, wherein X comprised as X$_2$O$_3$ in the framework structure of the first zeolitic material
and/or, preferably and,
wherein X provided as the one or more sources for X$_2$O$_3$ in (1) is, independently from one another, selected from the group consisting of Al, B, In, Ga, and mixtures of two or more thereof, X preferably being Al and/or B, and more preferably being Al.

40. The process of any one of embodiments 1 to 39, wherein the one or more sources for $X_2O_3$ comprises one or more compounds selected from the group consisting of $Al_2C_3$, $Al(OH)_3$, aluminates, aluminum alcoholates, and mixtures of two or more thereof, preferably from the group consisting of $Al(OH)_3$, alkali metal aluminates, alkaline earth metal aluminates, aluminum (C1-C4)alcoholates, and mixtures of two or more thereof, more preferably from the group consisting of $Al(OH)_3$, sodium aluminate, aluminum (C2-C3)alcoholates, and mixtures of two or more thereof, more preferably from the group consisting of $Al(OH)_3$, sodium aluminate, aluminum (C3)alcoholates, and mixtures of two or more thereof, wherein more preferably the one or more sources for $X_2O_3$ comprises aluminum triisopropylate, wherein more preferably the one or more sources for $X_2O_3$ is aluminum triisopropylate.

41. The process of any one of embodiments 1 to 40, wherein the amount of seed crystals in the mixture prepared in (1) ranges from 0.5 to 35 wt.-% based on 100 wt.-% of $SiO_2$ in the one or more sources for SiO2, preferably from 1 to 30 wt.-%, more preferably from 5 to 28 wt.-%, more preferably from 10 to 26 wt.-%, more preferably from 15 to 24 wt.-%, and even more preferably from 18 to 22 wt.-%, wherein preferably the seed crystals consist of the second zeolitic material obtained in (B).

42. The process of any one of embodiments 1 to 41, wherein the mixture prepared in (1) further comprises one or more solvents, wherein said one or more solvents preferably comprises water, more preferably distilled water.

43. The process of embodiment 42, wherein the mixture prepared in (1) further comprises water as a solvent, and wherein the $H_2O:SiO_2$ molar ratio of the mixture prepared in (1) ranges from 5 to 250, preferably from 10 to 200, more preferably from 30 to 180, more preferably from 50 to 150, more preferably from 80 to 120, and even more preferably from 90 to 110.

44. The process of any one of embodiments 1 to 43, wherein the heating in (2) is conducted under solvothermal conditions, preferably under hydrothermal conditions.

45. The process of any one of embodiments 1 to 44, wherein heating of the mixture is conducted at a temperature ranging from 80 to 250° C., preferably from 110 to 220° C., more preferably from 130 to 200° C., more preferably from 150 to 190° C., and even more preferably from 160 to 180° C.

46. The process of any one of embodiments 1 to 45, wherein in (2) heating of the mixture is conducted for a period ranging from 6 h to 6 d, preferably from 12 h to 4 d, more preferably from 24 h to 3 d, and even more preferably from 1.5 to 2.5 d.

47. The process of any one of embodiments 1 to 46, wherein after obtaining a zeolitic material in (2) the process further comprises one or more of:
(2a) isolating the zeolitic material obtained in (2), preferably by filtration,
and/or
(2b) washing the zeolitic material obtained in (2) or (2a),
and/or
(2c) drying the zeolitic material obtained in (2), (2a), or (2b),
wherein the steps (2a) and/or (2b) and/or (2c) can be conducted in any order, and
wherein one or more of said steps is preferably repeated one or more times.

48. The process of any one of embodiments 1 to 47, further comprising
(3) subjecting the zeolitic material obtained in (2), (2a), (2b), or (2c) to an ion-exchange procedure, wherein preferably one or more ionic extra-framework elements contained in the zeolite framework is ion-exchanged against $H^+$ and/or $NH_4^+$, more preferably against $NH_4^+$.

49. The process of any one of embodiments 1 to 48, further comprising (4) subjecting the zeolitic material obtained in (2), (2a), (2b), (2c), or (3) to an ion-exchange procedure, wherein preferably one or more ionic extra-framework elements contained in the zeolite framework is ion-exchanged against one or more metal cations selected from the group consisting of Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of Sr, Cr, Mo, Fe, Co, Ni, Cu, Zn, Ag, and mixtures of two or more thereof, more preferably from the group consisting of Cr, Mg, Mo, Fe, Ni, Cu, Zn, Ag, and mixtures of two or more thereof, more preferably from the group consisting of Mg, Mo, Fe, Ni, Cu, Zn, Ag, and mixtures of two or more thereof, wherein more preferably the one or more metal contions comprise Cu and/or Fe, preferably Cu, wherein even more preferably the one or more metal cations consist of Cu and/or Fe, preferably of Cu;
wherein the one or more ionic extra-framework elements preferably comprise $NH_4^+$, $H^+$, and/or an alkali metal, the alkali metal preferably being selected from the group consisting of Li, Na, K, Cs, and combinations of two or more thereof, wherein more preferably the one or more ionic extra-framework elements comprise one or more metal cations and/or cationic elements selected from the group consisting of $NH_4^+$, $H^+$, Li, Na, K, and combinations of two or more thereof, more preferably from the group consisting of $H^+$, Na, K, and combinations of two or more thereof, wherein more preferably the one or more ionic extra-framework elements comprise $H^+$, wherein even more preferably the one or more ionic extra-framework elements consists of $H^+$.

50. The process of any one of embodiments 1 to 49, further comprising
(5) calcining the zeolitic material obtained in (2), (2a), (2b), (2c), (3), or (4).

51. The process of any one of embodiments 29 to 50, wherein the temperature of calcination in (B.4) and/or (5) is in the range of from 300 to 900° C., preferably of from 400 to 700° C., more preferably of from 450 to 650° C., and more preferably of from 500 to 600° C.

52. The process of any one of embodiments 29 to 51, wherein calcining in (B.4) and/or (5) is conducted for a period in the range of from 0.5 to 24 h, preferably from 1 to 15 h, more preferably from 2 to 12 h, more preferably from 2.5 to 9 h, more preferably from 3 to 7 h, more preferably from 3.5 to 6.5 h, more preferably from 4 to 6 h, and more preferably from 4.5 to 5.5 h.

53. The process of any one of embodiments 47 to 52, comprising
(R) subjecting the zeolitic material obtained in (2a), (2b), (2c), (3), (4), or (5) to a procedure for removing at least a portion of X, preferably tetrahedrally coordinated X, from the framework structure of the zeolitic material.

54. The process of any one of embodiments 1 to 53, wherein neither during nor after (1) and prior to (2), (2a), (2b), (2c), (3), (4), (5), or (R) does the organotemplate-free synthetic process comprise a calcination procedure.

55. The process of any one of embodiments 1 to 54, wherein the procedure in (R) for removing at least a portion of X from the framework structure of the zeolitic material comprises one or more steam-treatment steps (S).

56. The process of embodiment 55, wherein the one or more steam-treatment steps (S) are conducted at a temperature of from 200 to 1,000° C., preferably of from 300 to 900° C., preferably of from 400 to 800° C., preferably of from 500 to 700° C., and even more preferably of from 550 to 650° C.

57. The process of embodiment 55 or 56, wherein the one or more steam-treatment steps (S) are conducted for a duration of from 0.1 to 48 h, preferably of from 0.2 to 24 h, more preferably of from 0.3 to 12 h, more preferably of from 0.35 to 6 h, more preferably of from 0.4 to 4 h, more preferably of from 0.45 to 2 h, and even more preferably of from 0.5 to 1.5 h.

58. The process of any one of embodiments 55 to 57, wherein the one or more steam-treatment steps (S) are conducted using a steam concentration of from 5 to 95 vol.-%, preferably of from 10 to 90 vol.-%, and more preferably of from 20 to 80 vol.-%, and more preferably of from 30 to 70 vol.-%, and more preferably of from 40 to 60 vol.-%, and more preferably of from 45 to 55 vol.-%, wherein the remaining volume is preferably an inert gas, more preferably nitrogen.

59. A synthetic zeolitic material comprising one or more zeolite intergrowth phases of one or more zeolites having a CHA-type framework structure and one or more zeolites having an AFT-type framework structure, wherein the zeolitic material is obtainable and/or obtained according to the process of any one of embodiments 1 to 58.

60. A synthetic zeolitic material, preferably obtainable and/or obtained according to the process of any one of embodiments 1 to 58, comprising one or more zeolite intergrowth phases of one or more zeolites having a CHA-type framework structure comprising $SiO_2$ and $X_2O_3$, and one or more zeolites having an AFT-type framework structure comprising $SiO_2$ and $X_2O_3$, wherein X is a trivalent element, and wherein in the CO FT-IR spectrum of the zeolitic material measured in the wavenumber range of from 3,000 to 3,800 $cm^{-1}$ at a pressure of 1,000 Pa, the absorbance band with the highest negative absorbance displays its minimum in the range of from 3,580 to 3,700 $cm^{-1}$, preferably from 3,600 to 3,680 $cm^{-1}$, more preferably from 3,620 to 3,670 $cm^{-1}$, more preferably from 3,630 to 3,660 $cm^{-1}$, and more preferably from 3,640 to 3,650 $cm^{-1}$,
and the absorbance band with the highest positive absorbance displays its maximum in the range of from 3,350 to 3,560 $cm^{-1}$, preferably from 3,370 to 3,540 $cm^{-1}$, more preferably from 3,390 to 3,520 $cm^{-1}$, more preferably from 3,410 to 3,500 $cm^{-1}$, more preferably from 3,430 to 3,480 $cm^{-1}$, and more preferably from 3,450 to 3,460 $cm^{-1}$.

61. The zeolitic material of embodiment 59 or 60, wherein the synthetic zeolitic material comprises COE-10, wherein preferably the synthetic zeolitic material is COE-10.

62. The zeolitic material of any one of embodiments 59 to 61, wherein the framework of the zeolitic material contains substantially no phosphorous, wherein preferably the zeolitic material contains substantially no phosphorous or phosphorous containing compounds.

63. The zeolitic material of any one of embodiments 59 to 62, wherein X is selected from the group consisting of Al, B, In, Ga, and mixtures of two or more thereof, X preferably being Al and/or B, and more preferably being Al.

64. The zeolitic material of any one of embodiments 59 to 63, wherein one or more zeolites having a CHA-type framework structure comprising $SO_2$ and $X_2O_3$ are selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li—Na| [Al—Si—O]-CHA, (Ni(deta)2)-UT-6, SSZ-13, and SSZ-62, including mixtures of two or more thereof,
preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof,
more preferably from the group consisting of Chabazite, Linde D, Linde R, SAPO-34, SSZ-13, and SSZ-62, including mixtures of two or more thereof,
more preferably from the group consisting of Chabazite, SSZ-13, and SSZ-62, including mixtures of two or three thereof,
wherein more preferably the one or more zeolites having a CHA-type framework structure comprises chabazite and/or SSZ-13, preferably SSZ-13, and wherein more preferably the one or more zeolites having a CHA-type framework structure is chabazite and/or SSZ-13, preferably SSZ-13.

65. The zeolitic material of any one of embodiments 59 to 64, wherein the $SiO_2:X_2O_3$ molar ratio of the zeolitic material ranges from 2 to 50, preferably from 3 to 30, more preferably from 4 to 20, more preferably from 5 to 15, more preferably from 6 to 12, more preferably from 6.5 to 9, more preferably from 7 to 8, and more preferably from 7.2 to 7.6.

66. The zeolitic material of any one of embodiments 59 to 65, wherein the framework structure of the one or more zeolite intergrowth phases comprises AABBCC and AACCBB crystallographic stacking sequences of 6 crystallographic layers, respectively, along the crystallographic c-axis, wherein the portion of the total number of crystallographic layers consisting of AABBCC and AACCBB crystallographic stacking sequences along the crystallographic c-axis in the framework structure of the one or more zeolite intergrowth phases, which consists of AABBCCAACCBB crystallographic stacking sequences of 12 layers ranges from 10 to 90%±5%, preferably from 20 to 80%±5%, more preferably from 30 to 70%±5%, more preferably from 35 to 65%±5%, more preferably from 40 to 60%±5%, more preferably from 44 to 56%±5%, more preferably from 46 to 54%±5%, more preferably from 48 to 52%±5%, and more preferably from 49 to 50%±5%.

67. The zeolitic material of any one of embodiments 59 to 66, wherein the BET surface area determined according to ISO 9277:2010 of the zeolitic material ranges from 200 to 850 $m^2/g$, preferably from 400 to 800 $m^2/g$, more preferably from 500 to 750 $m^2/g$, more preferably from 600 to 700 $m^2/g$, and even more preferably from 625 to 675 $m^2/g$.

68. The zeolitic material of any one of embodiments 59 to 67, wherein the total pore volume determined according to ISO 15901-3:2007 of the zeolitic material ranges from 0.2 to 90 $cm^3/g$, preferably from 0.3 to 75 $cm^3/g$, more preferably from 0.35 to 70 $cm^3/g$, more preferably from 0.4 to 66 $cm^3/g$, more preferably from 0.42 to 64 $cm^3/g$, more preferably from 0.44 to 62 $cm^3/g$, more preferably from 0.46 to 60 $cm^3/g$, more preferably from 0.48 to 58 $cm^3/g$ more preferably from 0.5 to 56 $cm^3/g$, and more preferably from 0.52 to 0.54 $cm^3/g$.

69. The zeolitic material of any one of embodiments 59 to 68, wherein the mesopore volume determined according to ISO 15901-3:2007 of the zeolitic material ranges from 0.1 to 0.6 cm³/g, preferably from 0.15 to 0.5 cm³/g, more preferably from 0.2 to 0.45 cm³/g, more preferably from 0.22 to 0.4 cm³/g, more preferably from 0.24 to 0.38 cm³/g, more preferably from 0.26 to 0.36 cm³/g, more preferably from 0.28 to 0.34 cm³/g, and more preferably from 0.3 to 0.32 cm³/g.

70. The zeolitic material of any one of embodiments 59 to 69, wherein the deconvoluted spectrum of the temperature programmed desorption of ammonia ($NH_3$-TPD) obtained for the zeolitic material displays a maximum in the temperature range of from 150 to 175° C., preferably from 152 to 173° C., more preferably from 154 to 171° C., more preferably from 156 to 169° C., more preferably from 158 to 167° C., more preferably from 160 to 165° C., and more preferably from 161 to 163° C.,
wherein the area of the deconvoluted peak for said maximum corresponds to an amount of acid sites in the range of from 0.01 to 1.0 mmol/g, preferably from 0.03 to 0.8 mmol/g, more preferably from 0.05 to 0.6 mmol/g, more preferably from 0.07 to 0.5 mmol/g, more preferably from 0.09 to 0.45 mmol/g, more preferably from 0.11 to 0.4 mmol/g, more preferably from 0.13 to 0.35 mmol/g, more preferably from 0.15 to 0.3 mmol/g, more preferably from 0.17 to 0.27 mmol/g, more preferably from 0.19 to 0.25 mmol/g, and more preferably from 0.21 to 0.23 mmol/g.

71. The zeolitic material of any one of embodiments 59 to 70, wherein the deconvoluted spectrum of the temperature programmed desorption of ammonia ($NH_3$-TPD) obtained for the zeolitic material displays a maximum in the temperature range of from 170 to 220° C., preferably from 175 to 215° C., more preferably from 180 to 212° C., more preferably from 183 to 209° C., more preferably from 185 to 207° C., more preferably from 187 to 205° C., more preferably from 189 to 203° C., more preferably from 191 to 201° C., more preferably from 193 to 199° C., and more preferably from 195 to 197° C.,
wherein the area of the deconvoluted peak for said maximum corresponds to an amount of acid sites in the range of from 0.01 to 0.7 mmol/g, preferably from 0.05 to 0.6 mmol/g, more preferably from 0.1 to 0.55 mmol/g, more preferably from 0.15 to 0.5 mmol/g, more preferably from 0.2 to 0.49 mmol/g, more preferably from 0.25 to 0.47 mmol/g, more preferably from 0.3 to 0.45 mmol/g, more preferably from 0.35 to 0.43 mmol/g, more preferably from 0.37 to 0.41 mmol/g, and more preferably from 0.39 to 0.4 mmol/g.

72. The zeolitic material of any one of embodiments 59 to 71, wherein the deconvoluted spectrum of the temperature programmed desorption of ammonia ($NH_3$-TPD) obtained for the zeolitic material displays a maximum in the temperature range of from 180 to 300° C., preferably from 210 to 290° C., more preferably from 230 to 285° C., more preferably from 240 to 280° C., more preferably from 245 to 277° C., more preferably from 250 to 275° C., more preferably from 255 to 273° C., more preferably from 260 to 271° C., more preferably from 263 to 269° C., and more preferably from 265 to 267° C.,
wherein the area of the deconvoluted peak for said maximum corresponds to an amount of acid sites in the range of from 0.1 to 0.7 mmol/g, preferably from 0.15 to 0.68 mmol/g, more preferably from 0.2 to 0.64 mmol/g, more preferably from 0.25 to 0.62 mmol/g, more preferably from 0.3 to 0.6 mmol/g, more preferably from 0.35 to 0.58 mmol/g, more preferably from 0.4 to 0.56 mmol/g, more preferably from 0.45 to 0.54 mmol/g, more preferably from 0.47 to 0.52 mmol/g, and more preferably from 0.49 to 0.5 mmol/g.

73. Use of a synthetic zeolitic material according to any one of embodiments 59 to 72 as a molecular sieve, as an adsorbent, for ion-exchange, or as a catalyst and/or as a catalyst support, preferably as a catalyst for the selective catalytic reduction (SCR) of nitrogen oxides $NO_x$; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_x$, and more preferably for the selective catalytic reduction (SCR) of nitrogen oxides $NO_x$ in exhaust gas from a combustion engine, preferably from a diesel engine or from a lean burn gasoline engine, wherein more preferably the zeolitic material in the conversion of alcohols to olefins, and more preferably in methanol to olefin (MTO) catalysis.

EXAMPLES

Figure 1:
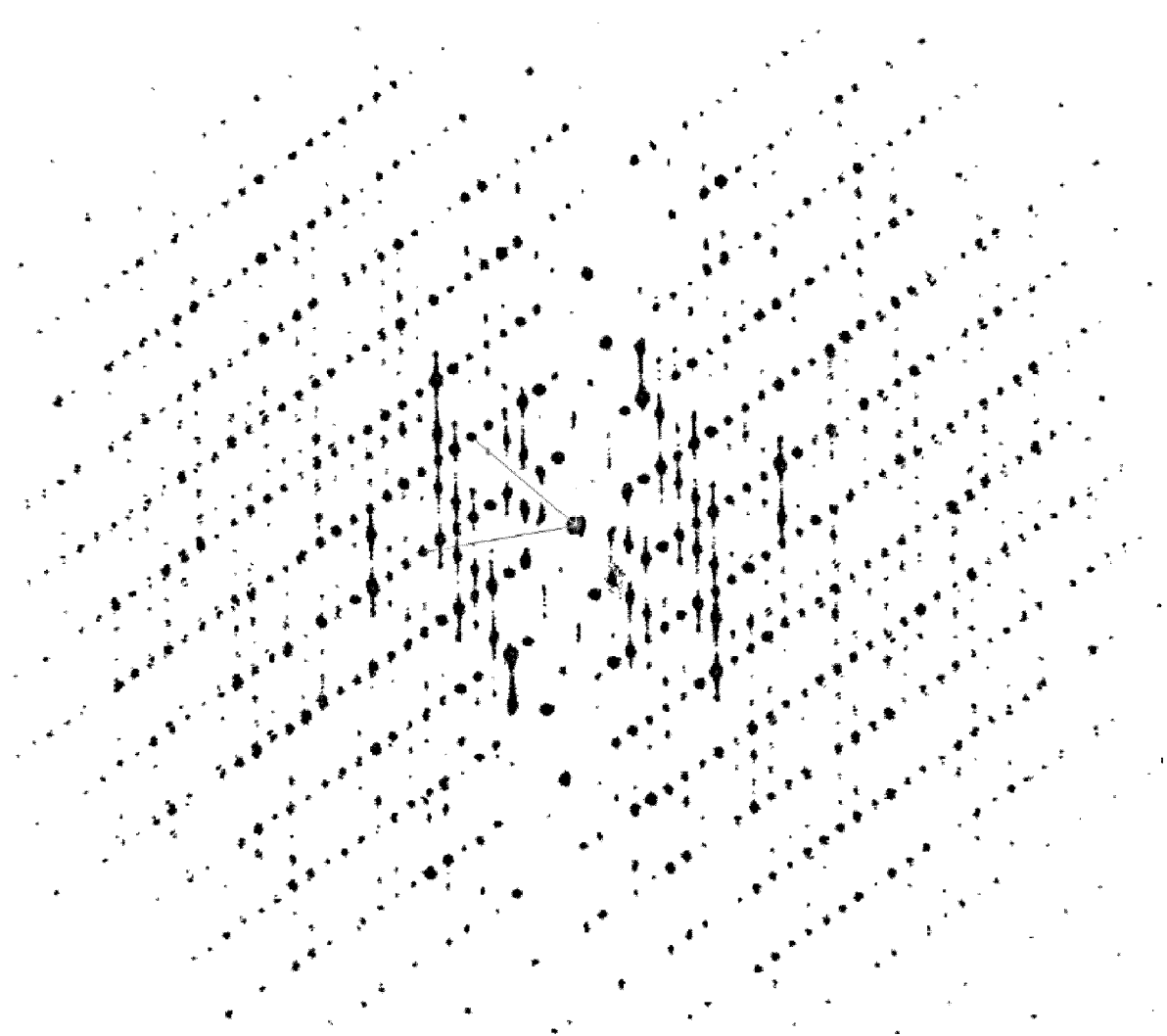
FIG. 1 displays the reconstructed ADT data from Example 3.

The present invention is further illustrated by the following examples and reference examples.

X-Ray Diffraction Measurements

The powder X-ray diffraction (XRD) patterns were collected on a Rigaku Ultima III diffractometer using CuKa radiation (40 kV, 40 mA).

Nitrogen Adsorption-Desorption Measurements

The nitrogen adsorption-desorption measurements were performed on a BEL-mini analyzer, BEL Japan. Prior to the measurements, all samples were degassed at 350° C. for 3 h.

$NH_3$-TPD Measurements

Temperature-programmed desorption of ammonia ($NH_3$-TPD) profiles were recorded on a Multi-track TPD equipment (Japan BEL). Typically, 25 mg catalyst were pretreated at 873 K in a He flow (50 mL/min) for 1 h and then cooled to 373 K. Prior to the adsorption of $NH_3$, the sample was evacuated at 373 K for 1 h. Approximately 2500 Pa of $NH_3$ were allowed to make contact with the sample at 373 K for 30 min. Subsequently, the sample was evacuated to remove weakly adsorbed $NH_3$ at the same temperature for 30 min. Finally, the sample was heated from 373 to 873 K at a ramping rate of 10 K/min in a He flow (50 mL/min). A thermal conductivity detector (TCD) was used to monitor desorbed $NH_3$.

CO FT-IR Measurements

FTIR spectra were obtained at a resolution of 4 $cm^{-1}$ using a Jasco FTIR 4100 spectrometer equipped with a TGS detector. The powdered samples (~30 mg) were pelletized into a self-supporting disk of 1 cm in diameter, which was held in a glass cell. After evacuation at 500° C. for 1 h, the sample was cooled back to -120° C. prior to background spectra acquisition. Then CO was introduced into the cell in a pulse mode fashion (approx. 5 Pa for the first pulse, until total pressure in the IR cell reached approx. 1000 Pa). After equilibrium NO pressure was reached after each pulse of CO, an IR spectrum was acquired.

Reference Example 1

Synthesis of CHA Seeds 2.31 g of Y zeolite (CBV712 from Zeolyst, having an $SO_2$:$Al_2O_3$ molar ratio of 12) were added to an aqueous solution containing 0.28 g of NaOH (97%; from Wako Chemicals) and 7.28 g of a 20 wt-% aqueous trimethyladamantylammonium hydroxide (TMAdaOH) solution (corresponding to 1.42 g of trimethyladamantylammonium hydroxide in solution), after which the mixture was stirred for 1 h. The molar composition of the resultant gel was 1 $SiO_2$:0.083 $Al_2O_3$:0.1 NaOH:0.2 TMAdaOH:10 $H_2O$. The thus prepared mother gel was crystallized in an autoclave at 150° C. for 2 days under tumbling conditions (40 rpm.). The crystalline solid product, a zeolitic material having framework type CHA, was recovered by filtration, washed with distilled water, dried overnight at 100° C., and calcined at 600° C. for 6 h under air.

Example 2

Synthesis of COE-10 Having a CHA-AFT Intergrowth Phase 0.817 g aluminum triisopropylate (Al(OiPr)$_3$ (>99.9%; from Kanto Chemical) were added to an aqueous solution containing 72 g of distilled water, 0.96 g NaOH (>99%; from Wako Chemicals), and 0.224 g KOH (>85%, from Wako Chemicals), after which the solution was stirred for 1 h. Then, 2.4 g fumed silica (Cab-O-Sil® M5, from Cabot) were added to the mixture, which was then stirred for 1 h. The molar composition of the resultant gel was 1 $SO_2$:0.1 Al(OiPr)$_3$ : 0.6 NaOH:0.1 KOH:100 $H_2O$. Then, 0.48 g (20 weight-% based on silica) of the calcined CHA seeds from Reference Example 1 were added to the mixture. The thus prepared mother gel was crystallized in an autoclave at 170° C. for 2 days under tumbling condition (20 rpm). The solid crystalline product was recovered by filtration, washed with distilled water, and dried overnight at 100° C. in air.

1 g of the zeolitic material obtained from crystllization was treated with 100 mL aqueous 2.5 M $NH_4NO_3$ at 80° C. for 3 h. The procedure was then repeated to obtain the ammonium form of the zeolitic material. Said product is referred to herein as NH4-COE-10.

The zeolitic material NH4-COE-10 was then calcined at 500° C. for 5 h under air to obtain the H-form of the zeolitic material, which is referred to herein as H-COE-10.

Elemental analysis of the product was performed on an inductively coupled plasma-atomic emission spectrometer (ICP-AES, Shimadzu ICPE-9000). The weight contents of Si and Al in the H-form of the zeolite COE-10 are 36.9 and 9.6%, respectively, based on the ICP results.

Example 3

Characterization of the CHA-AFT Intergrowth Phase COE-10

A powdered sample of the H-form of the zeolitic material obtained from Example 2 was dispersed in ethanol using an ultrasonic bath and sprayed onto a carbon-coated copper grid using a sonifier adapted for transmission electron microscopy (TEM), scanning transmission electron microscopy (STEM), electron dispersive X-ray spectroscopy (EDXS) and automated electron diffraction tomography (ADT) investigations. The sonifier used is described in E. Mugnaioli et al., Ultramicroscopy, 109 (2009) 758-765. TEM, EDX and ADT measurements were carried out with an FEI TECNAI F30 S-TWIN transmission electron microscope equipped with a field emission gun and working at 300 kV. TEM images and nano electron diffraction (NED) patterns were taken with a CCD camera (16-bit 4,096×4,096 pixel GATAN ULTRASCAN4000) and acquired by Gatan Digital Micrograph software. Scanning transmission electron microscopy (STEM) images were collected by a FISCHIONE high-angular annular dark field (HAADF) detector and acquired by Emispec ES Vision software. Three-dimensional electron diffraction data were collected using an automated acquisition module developed for FEI microscopes according to the procedure described in U. Kolb et al., Ultramicroscopy, 107 (2007) 507-513. For high tilt experiments, all acquisitions were performed with a FISCHIONE tomography holder. A condenser aperture of 10 μm and mild illumination settings (gun lens 8, spot size 6) were used in order to produce a semi-parallel beam of 200 nm in diameter on the sample (104 e$^-$/nm$^2$s). Crystal position tracking was performed in microprobe STEM mode and NED patterns were acquired sequentially in steps of 1°. Tilt series were collected within a total tilt range up to 90°, occasionally limited by overlapping of surrounding crystals or grid edges. ADT data were collected with electron beam precession (precession electron diffraction, PED) according to the procedure described in R. Vincent et al., Ultramicroscopy, 53 (1994) 271-282. PED was used in order to improve reflection intensity integration quality as described in E. Mugnaioli et al., Ultramicroscopy, 109 (2009) 758-765. PED was performed using a Digistar unit developed by NanoMEGAS SPRL. The precession angle was kept at 1.0°. The eADT software package was used for three-dimensional electron diffraction data processing as described in U. Kolb et al., Cryst. Res. Technol., 46 (2011) 542-554. Ab initio structure solution was performed assuming the kinematic approximation $I\approx|F_{hkl}|^2$ by direct methods implemented in the program SIR2014 as described in M. C. Burla et al., Journal of Applied Crystallography, 48 (2015) 306-309. Difference Fourier mapping and least-squares refinement were also performed with the software SIR2014 as described in M. C. Burla et al., Journal of Applied Crystallography, 48 (2015) 306-309. Scattering factors for electrons were taken from Doyle and Turner as described in P. A. Doyle et al., Acta Crystallographica Section A, 24 (1968) 390-397.

An ADT dataset was collected from an isolated lying particle and reconstructed in three-dimensional diffraction volume. For each measured particle, the diffraction volumes showed the same primitive lattice with diffuse scattering along the shortest reciprocal direction. For instance, the diffraction volume shown in FIG. 1, delivered a primitive lattice with the parameters a=14.26 Å, b=14.23 Å, c=15.80 Å, α=90.0°, β=90.1° and γ=119.6°. Under consideration of the scale factor based on the effective camera length, the lattice determined by ADT (14.245/15.80=0.9016) agrees the lattice parameters of loc-512_dehyd (13.4791/14.8954=0.9049). It should be noted, that the extinctions inferred from rhombohedral centering are violated. The data was indexed in rhombohedral setting with hexagonal lattice ($R_{sym}$=0.132, Laue class-3m) and the structure solved in space group R-3m (details listed in Table 1). Ab initio structure solution converged to a final residual $R_F$ of 0.0981. The five strongest maxima of the electron density map (from 1.13 to 0.56 eÅ$^{-3}$) correspond to one silicon atom and four oxygen atoms. The following 12 weakest maxima (from 0.38 to 0.03 eÅ$^{-3}$) were not taken into account.

TABLE 1

Crystallographic information about ADT measurements and structure solution of CHA.

| System | CHA |
|---|---|
| Tilt range/° | −45/+45 |
| No. of sampled reflections | 10704 |
| No. of independent reflections | 233 |
| Resolution/Å | 1.0 |
| Indep. refl. coverage/% | 68 |
| $R_{sym}$ | 0.104 |
| Overall U/Å$^2$ | 0.046 |
| Residual R(F) (SIR2014) | 0.098 |
| Reflections/parameter ratio | 5.9 |
| No. of indep. Si and O atoms | 5 |
| Space group | R-3 m |
| a/Å | 13.4791 |
| b/Å | 13.4791 |
| c/Å | 14.8954 |
| α/° | 90.0 |
| β/° | 90.0 |
| γ/° | 120.0 |
| V/Å$^3$ | 2343.70 |

Disorder Modelling and Diffraction Simulations

The stacked sequence of 6-rings in CHA (AABBCC . . . ) is partly disordered, indicated by the diffuse scattering along the direction c* obtained in the reconstructed diffraction data (see FIG. 1). The probability p, described as in the correlation matrix in Table 2, correlates with the volume fraction for an usual obverse-reverse twinning (a twinning via a two fold axis) in rhombohedrat crystal structures.

TABLE 2

Elements of the correlation matrix describe the probability for all possible stacking events

| Layer | α | β |
|---|---|---|
| α | 1-p | p |
| β | 1-p | p |

In order to cause diffuse scattering it must be assumed that within a scattering domain several twin surfaces occur, by change of the growth direction in an aperiodic crystal growth, as it is customary for polysynthetic twinning. A change in the growth direction results in a twinning plane containing a composite building unit aft, like in the framework type AFT [7] with an AABBCCAACCBB . . . sequence of 6-rings. This type of intergrowth leads to diffuse scattering in the reciprocal stacking direction c*.

Diffuse scattering between the Bragg reflections measured by ADT were compared with diffuse scattering calculated from simulated disordered crystals. The DISCUS program was used to model disordered CHA superstructures based on layer building units and to compare the simulated to experimental electron diffraction pattern as described in Y. Krysiak et al., Acta Crystallographica Section A Foundations and Advances, 74 (2018) 93-101. For the stacking module of DISCUS the correlation matrix that defines the specific sequence of layer types as function of the stacking probability, p, listed in Fehler! Verweisquelle konnte nicht gefunden werden. above, was used. It describes the probability of layer β (AACCBB) versus layer α (AABBCC).

Figure 2:
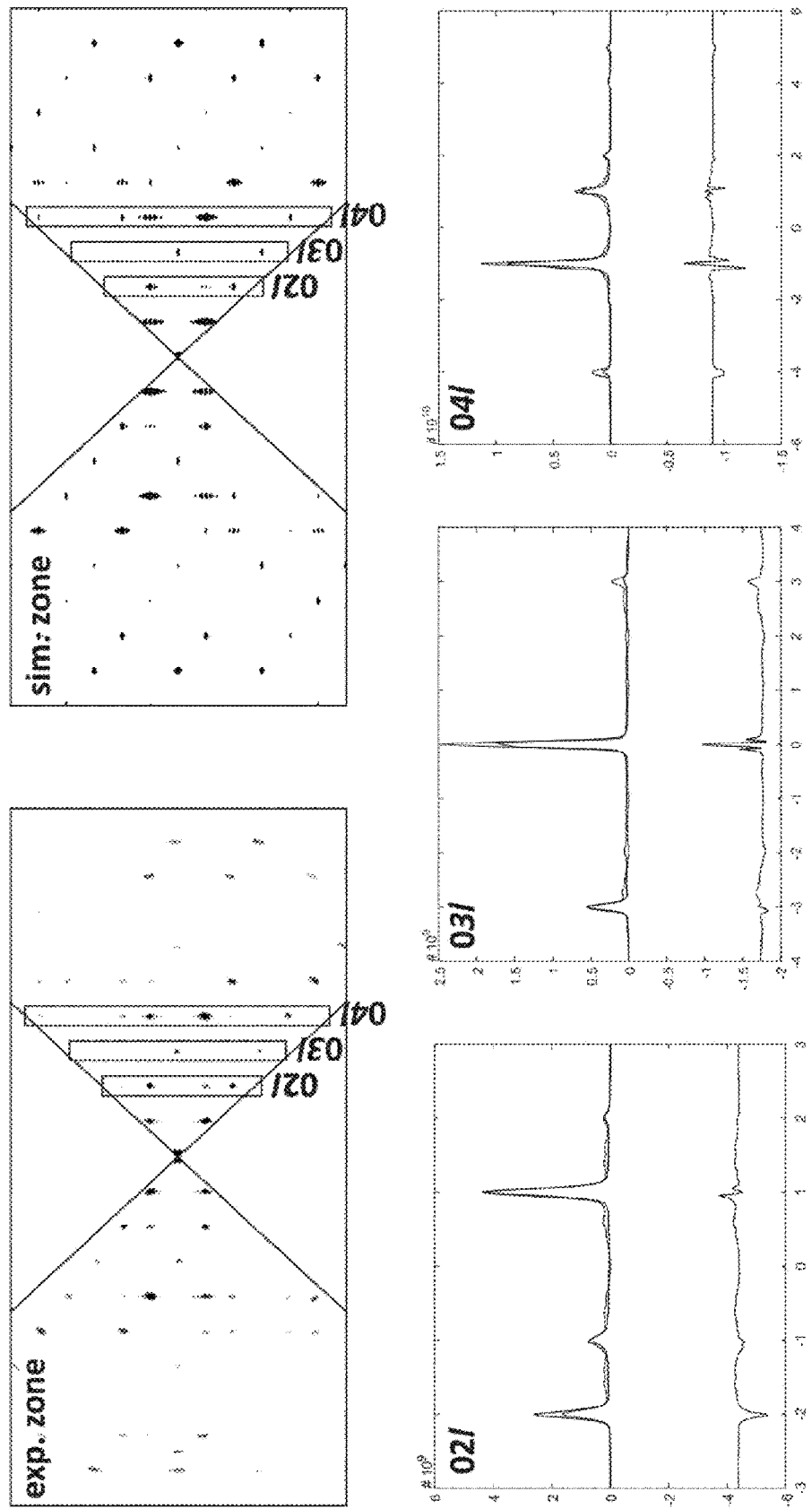
FIG. 2 displays the comparison of the experimental and simulated electron diffraction patterns of zone [100] of Example 3. In the figure, experimental (black) and simulated (for p=0.25 in dark grey) intensity profiles 02I, 03I and 04I taken along corresponding diffraction line marked by dark grey rectangles.

An example of an integrated [100]-zone image based on ADT data of Cu_Cry1 is provided in FIG. 2. The corresponding simulated two-dimensional electron diffraction pattern was calculated for p=0.0 to 0.5 in 0.05 steps. Qualitatively, the experimental and simulated patterns of diffuse scattering on the crystallographic zones are comparable (FIG. 2). The strongest diffuse streaks of zone [100] are observable for 02/and 04/reflections. These diffuse streaks were taken into account for a quantitative disorder analysis dependent on the stacking probability of layer β. Therefor the extracted experimental diffuse streaks were compared with the diffuse lines calculated in DISCUS by diffuse_compare. The best agreement between the experimental and the simulated diffuse lines was achieved for p=0.25(5), corresponding to a portion of 62.5% of the total number of crystallographic layers consisting of αα and ββ stacking and 37.5% of mixed crystallographic stacking sequences αβ and βα a along the crystallographic c-axis. The later resembles the framework structure of the intergrowth phase consisting of AABBCCAAC-CBB crystallographic stacking sequences with 3 AFT and 3 CHA cages in the unit cell with double volume compared to the CHA crystal structure. Taking this into account the ratio of CHA/AFT cages can be estimated as 4.33 by (62.5+37.5/2)/37.5/2.

Conclusion

The correlation matrix shown in Fehler! Verweisquelle konnte nicht gefunden werden. with p=0.25 results in a stacking sequence in which statistically every fourth layer a is turned by 180° and shifted by the vector [−⅓, ⅓, 0] (layer β). With a probability of 75% layer a is stacked vice versa. Every stacking sequence αβ or αβ leads to a natural tiling t-aft, which is not part of the ordered CHA-structure. The twin volume fractions differ from particle to particle ranging from a probability of p=0.25 to 0.5.

Example 4

Figure 3:
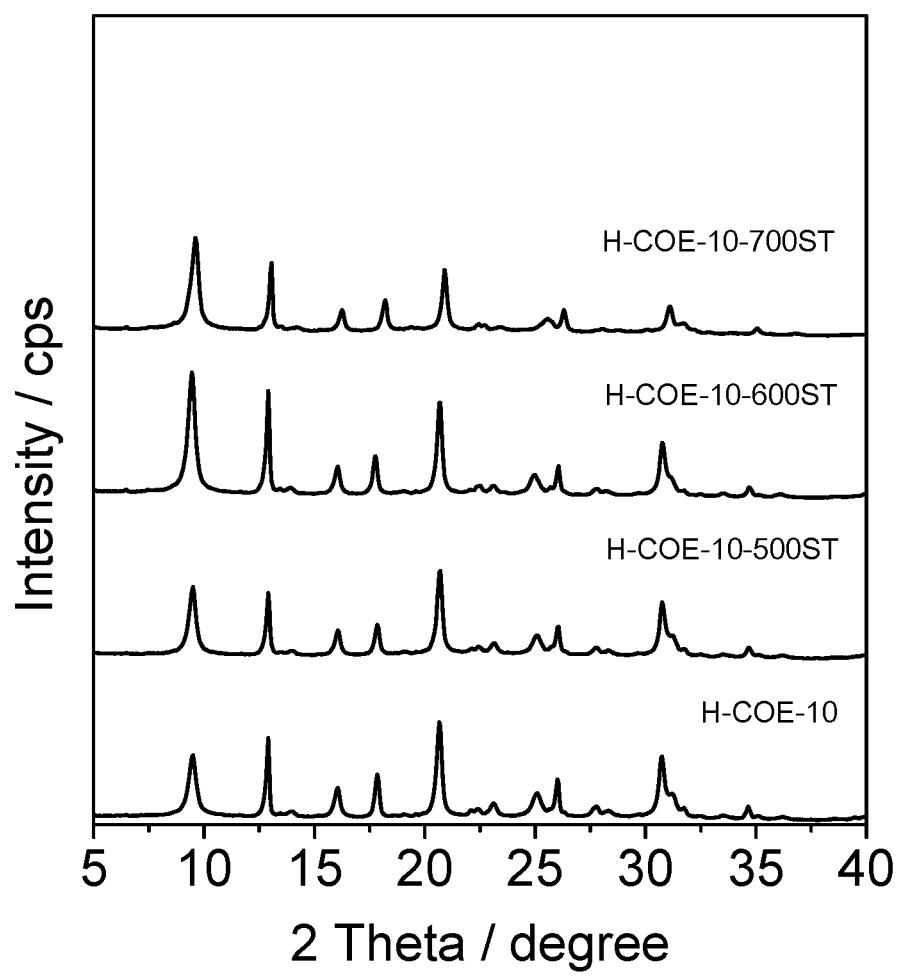
FIG. 3 displays the XRD patterns of the steam treated samples obtained from Example 4 compared to the H-form of the zeolitic material COE-10 from Example 3. In the respective diffractograms, the diffraction angle 2 theta in ° is shown along the abscissa and the intensities are plotted along the ordinate.
Figure 4:
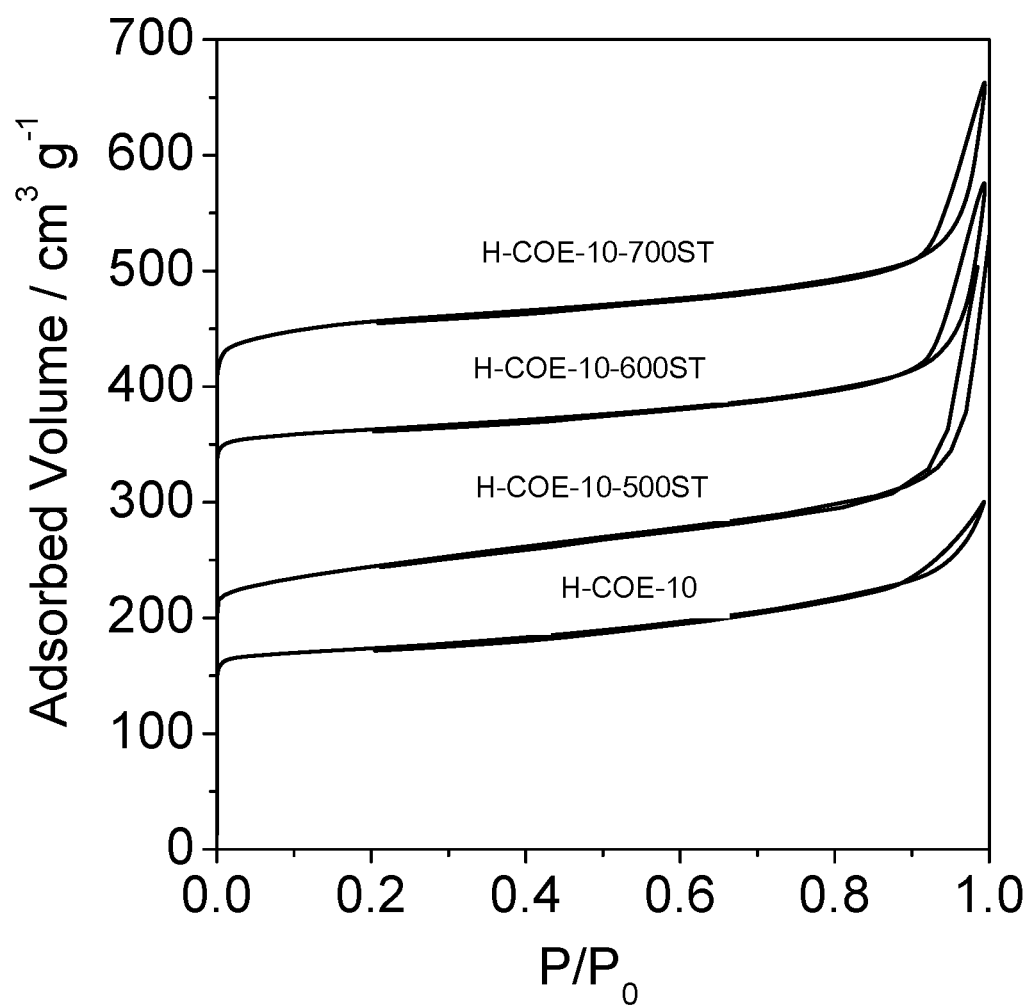
FIG. 4 displays the nitrogen adsorption-desorption measurements performed on the steam treated samples obtained from Example 4 compared to the H-form of the zeolitic material COE-10 from Example 3. In the respective isotherms, the relative pressure $P/P_0$ is shown along the abscissa and the absorbed volume in cm³/g is plotted along the ordinate.

Steam Treatment of COE-10 Having a CHA-AFT Intergrowth Phase 0.5 g samples of the $NH_4$-form of COE-10 from Example 2 ("NH4-COE-10") were loaded in the middle of a quartz tube in a tube furnace. The samples were heated to the desired temperature (ranging from 500 to 700° C.) at 5° C/min ramp and held there for 1 h under 50% $H_2O/N_2$. The steaming treatment was performed during the entire heating process, including ramping up and cooling-down. Thus obtained products were denoted as "H-COE-10-xST", where x means the steaming treatment temperature. As may be taken from the XRD and $N_2$ adsorption results displayed in FIGS. 3 and 4, the CHA structure remained almost intact for steamtreated H-COE-10, regardless of the steaming temperature. As may be taken from Table 3 below, the micropore volume of the steamtreated samples varied from 0.18 to 0.22 cm³/g.

TABLE 3

Results from BET surface area and micropore volume measurements obtained from the nitrogen adsorption-desorption measurements performed on the steam treated samples obtained from Example 4 compared to the H-form of the zeolitic material ("H-COE-10") from Example 2.

| Sample | $S_{BET}/m^2g^{-1}$ | $V_{micro}/cm^3g^{-1}$ | $V_{total}/cm^3g^{-1}$ | $V_{meso}/cm^3g^{-1}$ |
|---|---|---|---|---|
| H-COE-10 | 704 | 0.22 | 0.45 | 0.23 |
| H-COE-10-500ST | 530 | 0.18 | 0.58 | 0.40 |
| H-COE-10-600ST | 652 | 0.22 | 0.53 | 0.31 |
| H-COE-10-700ST | 579 | 0.20 | 0.52 | 0.32 |

Figure 5:
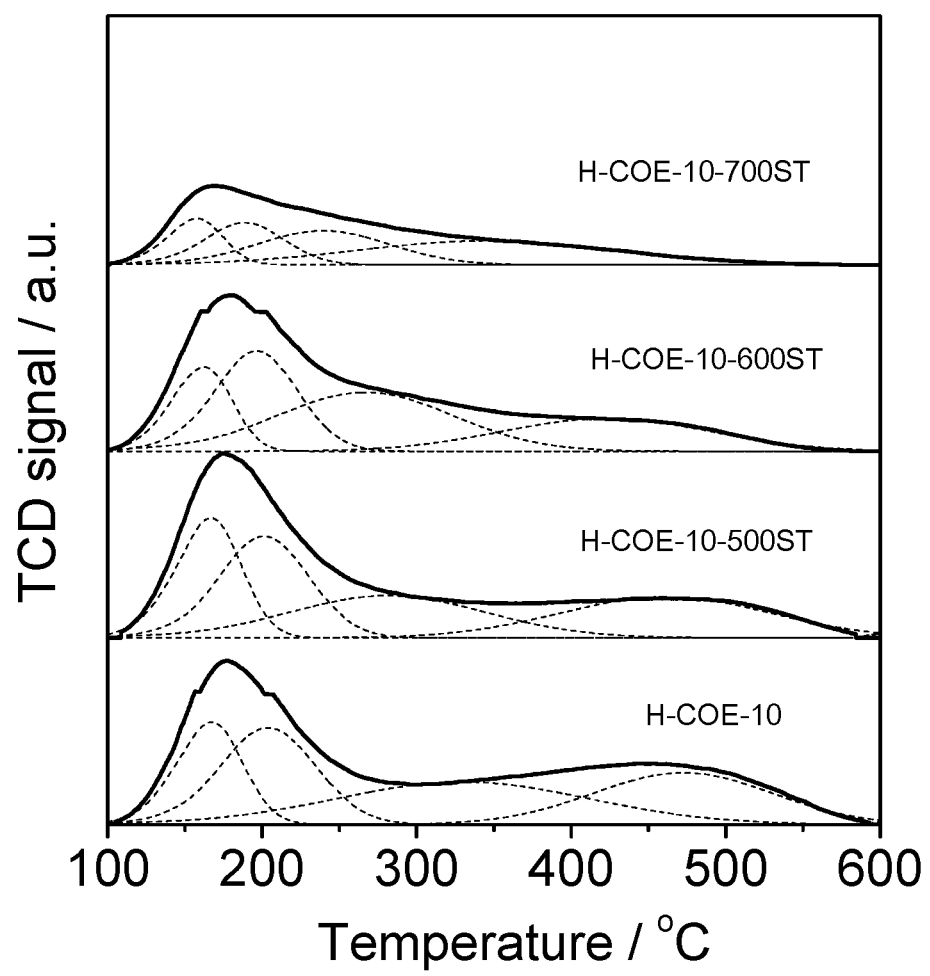
FIG. 5 displays the $NH_3$-TPD profiles obtained for the steam treated samples obtained from Example 4 compared to the H-form of the zeolitic material COE-10 from Example 3. In the respective TPD, the temperature in ° C. is shown along the abscissa and the TCD signal in arbitrary units is plotted along the ordinate.
Figure 6:
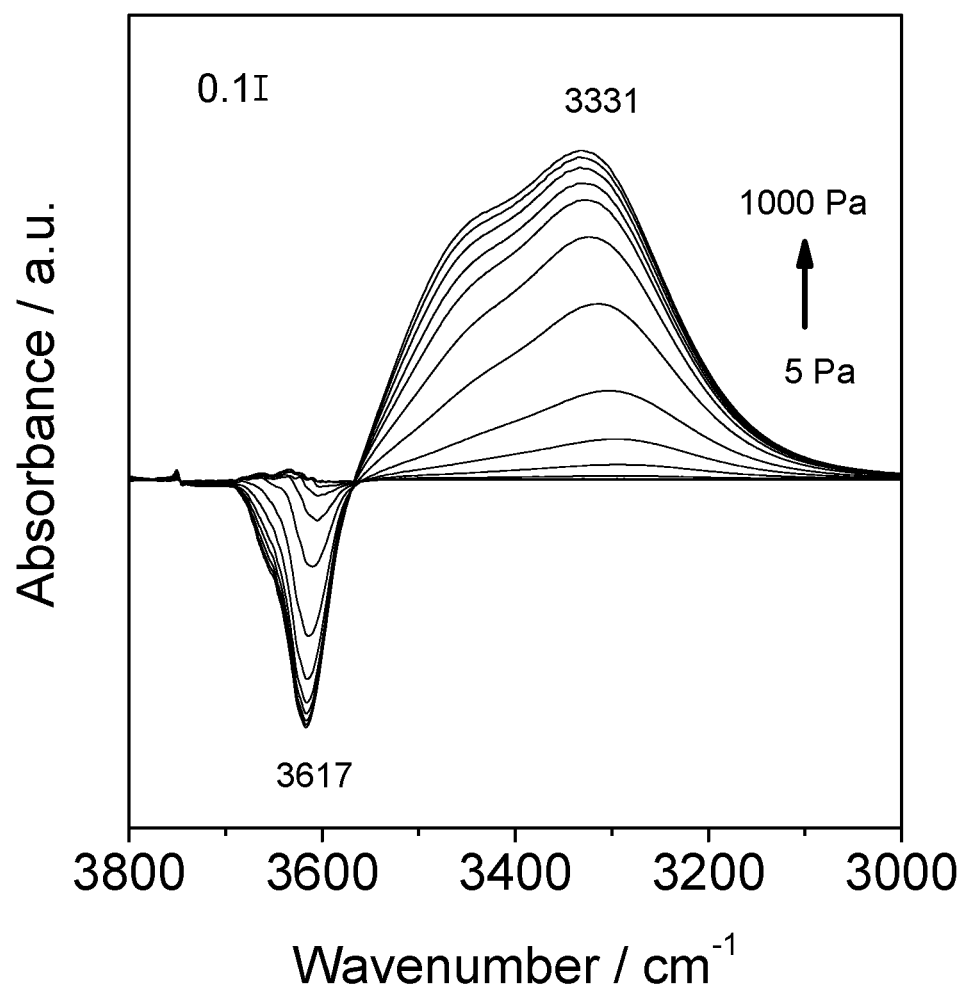
FIG. 6 displays the CO FT-IR measurements obtained for the H-form of the zeolitic material COE-10 from Example 3. In the IR spectrum, the wavenumber in cm⁻¹ is shown along the abscissa and the absorbance in arbitrary units is plotted along the ordinate.
Figure 7:
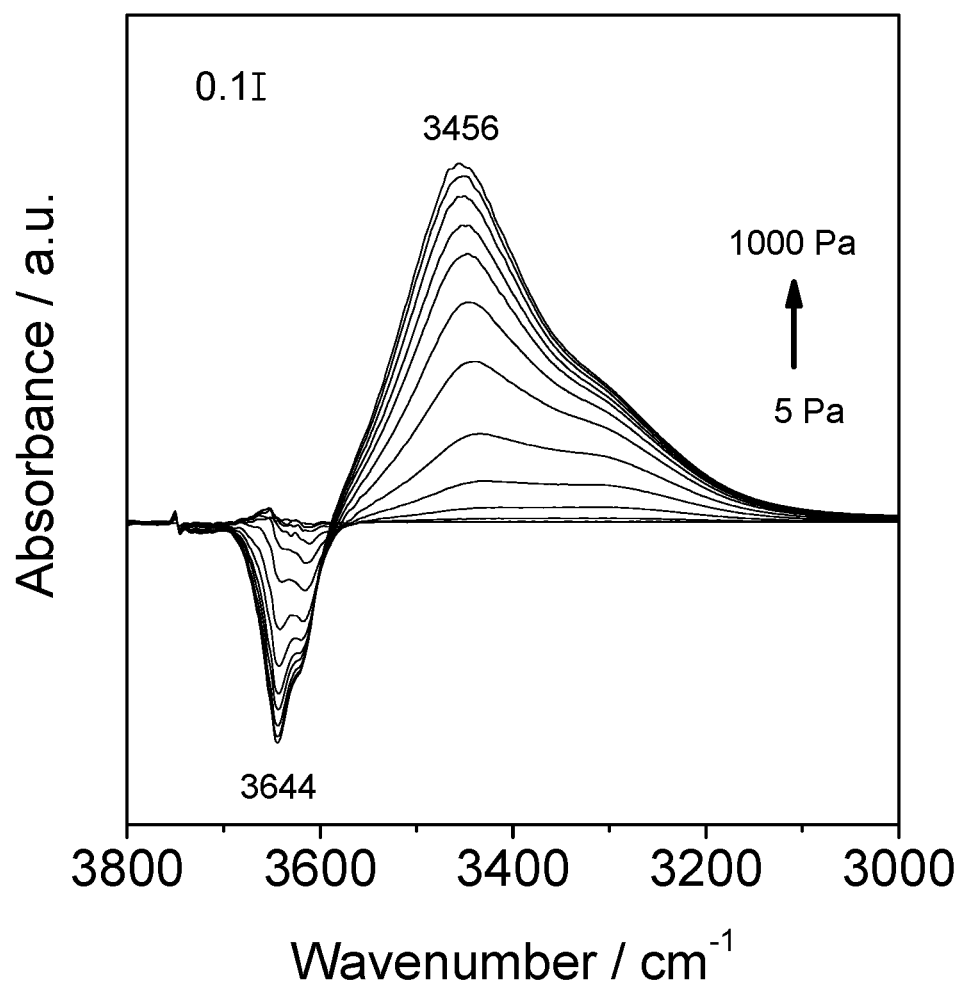
FIG. 7 displays the CO FT-IR measurements obtained for the sample from Example 4 which was steam treated at 600° C. In the IR spectrum, the wavenumber in cm⁻¹ is shown along the abscissa and the absorbance in arbitrary units is plotted along the ordinate.
Figure 8:
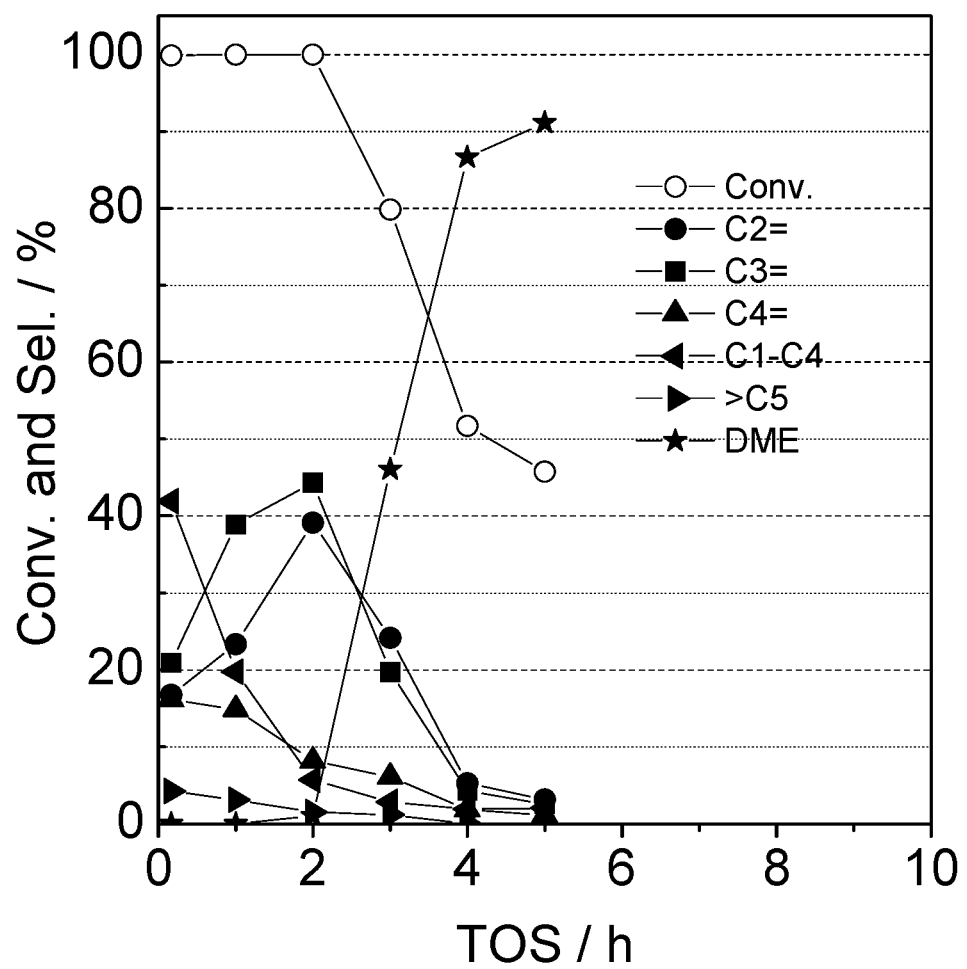
FIG. 8 displays the results from MTO testing obtained in Example 5 for the H-form of the zeolitic material COE-10 from Example 3. In the graph, the time on stream in hours is shown along the abscissa and the conversion "○" as well as the selectivities towards ethene "●", propene "■", butene "▲", C1-C4 alkane "◄", compounds with more than 5 carbon atoms "▶", and dimethylether "★" in % are plotted along the ordinate.
Figure 9:
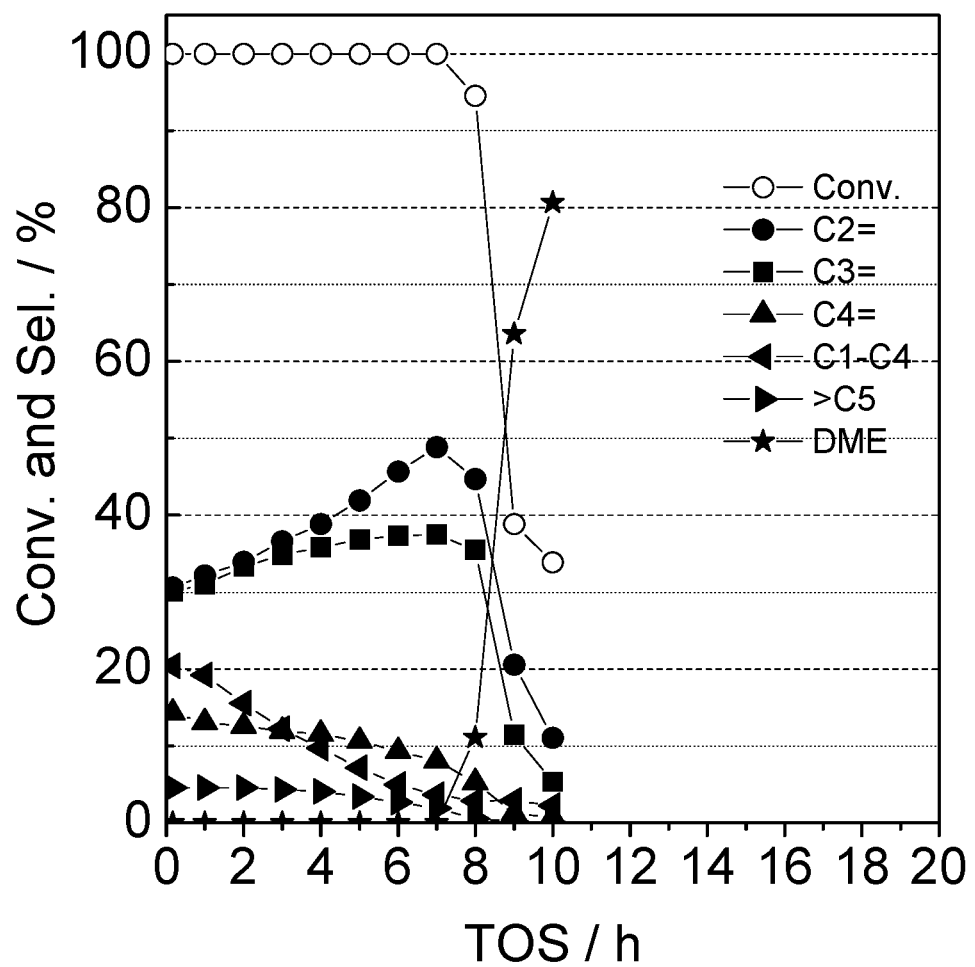
FIG. 9 displays the results from MTO testing obtained in Example 5 for the sample from Example 4 which was steam treated at 500° C. In the graph, the time on stream in hours is shown along the abscissa and the conversion "○" as well as the selectivities towards ethene "●", propene "■", butene "▲", C1-C4 alkane "◄", compounds with more than 5 carbon atoms "▶", and dimethylether "★" in % are plotted along the ordinate.
Figure 10:
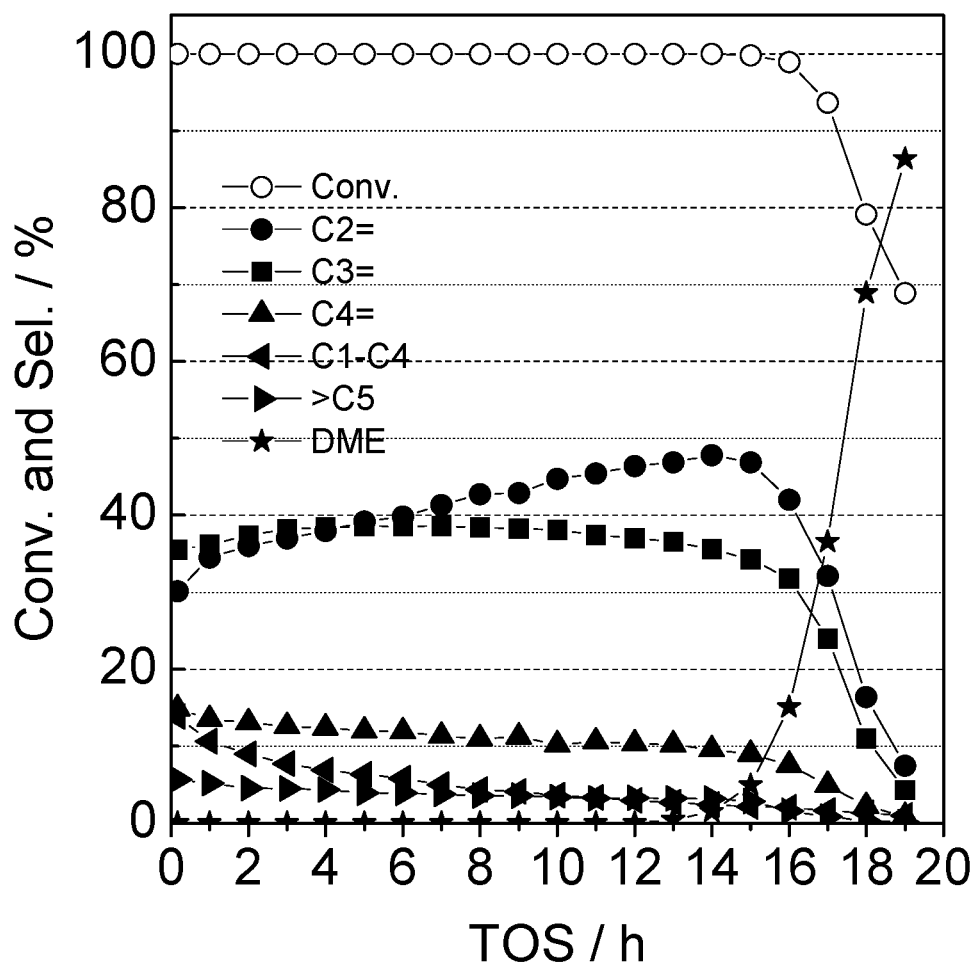
FIG. 10 displays the results from MTO testing obtained in Example 5 for the sample from Example 4 which was steam treated at 600° C. In the graph, the time on stream in hours is shown along the abscissa and the conversion "○" as well as the selectivities towards ethene "●", propene "■", butene "▲", C1-C4 alkane "◄", compounds with more than 5 carbon atoms "▶", and dimethylether "★" in % are plotted along the ordinate.
Figure 11:
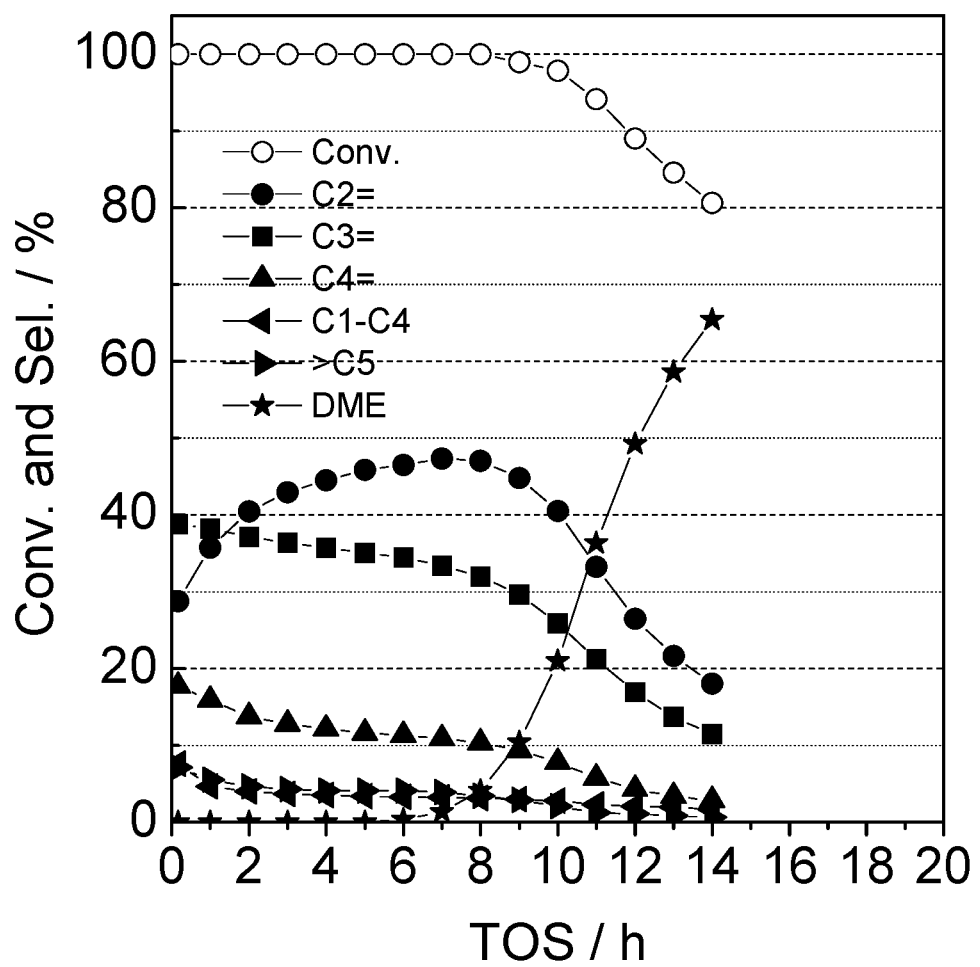
FIG. 11 displays the results from MTO testing obtained in Example 5 for the sample from Example 4 which was steam treated at 700° C. In the graph, the time on stream in hours is shown along the abscissa and the conversion "○" as well as the selectivities towards ethene "●", propene "■", butene "▲", C1-C4 alkane "◄", compounds with more than 5 carbon atoms "▶", and dimethylether "★" in % are plotted along the ordinate.

Although the bulk Si/Al ratio of the samples remained at ca. 3.7 after steaming, the framework Si/Al ratio was increased, as was calculated from the $^{29}Si$ MAS NMR results. For example, the framework Si/Al ratios for H-COE-10 and H-COE-10-600ST were 4.3 and 6.4, respectively. These results indicate that more Al atoms were removed from the framework after the steaming treatment. From the $NH_3$-TPD results displayed in FIG. 5, the acid amount gradually decreased with increasing the steaming temperature. The values obtained from the deconvolution of the results displayed in FIG. 5 are shown in Table 4 below. Moreover, the strong acid sites were preferentially removed after steaming treatment, as demonstrated by the CO adsorption FTIR results displayed in FIGS. 6 (for H-COE-10) and 7 (for H-COE-10-600ST).

TABLE 4

Deconvolution results from $NH_3$-TPD profiles displayed in Figure 5 for the steam treated samples obtained from Example 4 compared to the H-form of the zeolitic material ("H-COE-10") from Example 3.

| Sample | peak I/ mmol/g (° C.) | peak II/ mmol/g (° C.) | peak III/ mmol/g (° C.) | peak IV/ mmol/g (° C.) |
|---|---|---|---|---|
| H-COE-10 | 0.835 (169) | 0.437 (203) | 0.520 (329) | 0.448 (472) |
| H-COE-10-500ST | 0.346 (167) | 0.433 (200) | 0.398 (281) | 0.411 (461) |

TABLE 4-continued

Deconvolution results from NH$_3$-TPD profiles displayed in Figure 5 for the steam treated samples obtained from Example 4 compared to the H-form of the zeolitic material ("H-COE-10") from Example 3.

| Sample | peak I/ mmol/g (° C.) | peak II/ mmol/g (° C.) | peak III/ mmol/g (° C.) | peak IV/ mmol/g (° C.) |
|---|---|---|---|---|
| H-COE-10-600ST | 0.218 (162) | 0.394 (196) | 0.500 (266) | 0.300 (422) |
| H-COE-10-700ST | 0.111 (157) | 0.158 (188) | 0.217 (239) | 0.298 (343) |

Example 5

MTO Testing

The MTO reaction was carried out in a fix-bed reactor under atmospheric pressure. The pressure of methanol was set at 5 kPa. Helium was used as a carrier gas. W/F for methanol was set at 33.7 g-cat h mol-1. The catalyst was activated in flowing He at 500° C. for 1 h prior to the reaction and then cooled to the reaction temperature of 350° C. The reaction products were analyzed by an online gas chromatograph (GC-2014, Shimadzu) equipped with HP-PLOT/Q capillary column and an FID detector. The selectivities of the products were calculated on the basis of the carbon number. The methanol (MeOH) conversion was calculated based on the peak area in the GC spectra before and after reaction, i.e. Conv. %=[Peak Area (MeOH$_{initial}$)−Peak Area (MeOH$_{unreacted}$)]/Peak Area (MeOH$_{initial}$). The product selectivity was determined by the peak area in the GC spectra divided to the sum of all products, i.e. Sel. %=Peak Area (each product)/Peak Area (total products). It is noted that the relative correction factors were used for the oxygen-containing product (i.e., dimethyl ether (DME)) and MeOH.

The results from MTO testing as performed on the H-form of the zeolitic material ("H-COE-10") from Example 3 as well as on the steam treated samples obtained from Example 4 are displayed in FIGS. 8-11, respectively. Thus, as may be taken from the results, it has quite surprisingly been found that the time on stream of the H-form of the zeolitic material ("H-COE-10") from Example 3 in MTO may be increased by up to 8 times as long when steam treated. Furthermore, it has unexpectedly been found that the selectivity towards ethane and propene is reversed by the steam treatment of the catalyst, such that the higher selectivity towards propene observed for the non-steamed sample is transformed to a higher selectivity towards ethene in the experiments conducted with the steamed samples.

LIST OF CITED PRIOR ART DOCUMENTS

WO 2013/068976 A1
US 201 2/01 8951 8 A1
U.S. Pat. No. 6,334,994 B1
WO 98/15496 A1
WO 02/070407 A1
WO 2019/024909 A1
G. W. Skeels et al.: "Synthesis and characterization of phi-type zeolites LZ-276 and LZ-277: faulted members of the ABC-D6R family of zeolites", Microporous and Mesoporous Materials 1999, vol. 30, no. 2-3, pages 335-346;
EP 3 167 953 A1;
S. Goel et al.: "Synthesis of Zeolites via Interzeolite Transformations without Organic Structure-Directing Agents", Chem. of Materials 2015, vol. 27, no. 6, pages 2056-2066;
Y. Ji et al.: "Organic-Free Synthesis of CHA-Type Zeolite Catalysts for the Methanol-to-Olefins Reaction", ACS Catalysis 2015, vol. 5, no. 7, pages 4456-4465;
Y. Naraki et al.: "ZTS-1 and ZTS-2: Novel intergrowth zeolites with AFX/CHA structure", Microporous and Mesoporous Materials 2017, vol. 254, pages 160-169;
St. Wilson et al.: "Synthesis, characterization and structure of SAPO-56, a member of the ABC double-six-ring family of materials with stacking sequence AABBCCBB", Microporous and Mesoporous Materials 1999, vol. 28, no. 1, pages 125-137;

The invention claimed is:

1. A process for the production of a zeolitic material comprising one or more zeolite intergrowth phases of one or more zeolites having a CHA framework structure comprising SiO$_2$ and X$_2$O$_3$, and one or more zeolites having an AFT framework structure comprising SiO$_2$ and X$_2$O$_3$, wherein X is a trivalent element, and
wherein the process comprises:
(1) preparing a mixture comprising one or more sources for SiO$_2$, one or more sources for X$_2$O$_3$, and seed crystals comprising a zeolitic material, wherein the zeolitic material comprises SiO$_2$ and X$_2$O$_3$ in its framework structure and has a CHA framework structure;
(2) heating the mixture prepared in (1) for obtaining a zeolitic material comprising one or more zeolite intergrowth phases of one or more zeolites having a CHA framework structure and one or more zeolites having an AFT framework structure; and
(3) subjecting the zeolitic material obtained in (2) to a procedure for removing at least a portion of X from the framework structure of the zeolitic material; and
wherein the mixture prepared in (1) and heated in (2) comprises substantially no organotemplate.

2. The process of claim 1, wherein the zeolitic material obtained in (2) comprising one or more zeolite intergrowth phases of one or more zeolites having a CHA framework structure and one or more zeolites having an AFT framework structure, comprises COE-10.

3. The process of claim 1, wherein the zeolitic material comprised in the seed crystals in (1) is obtained by a process comprising:
(A) preparing a mixture comprising one or more structure directing agents and a first zeolitic material comprising SiO$_2$ and X$_2$O$_3$ in its framework structure, wherein the first zeolitic material has an FAU, FER, TON, MTT, BEA, MFI or combination thereof framework structure; and
(B) heating the mixture obtained in (A) for obtaining a second zeolitic material comprising SiO$_2$ and X$_2$O$_3$ in its framework structure, wherein the second zeolitic material has a CHA framework structure.

4. The process of claim 3, wherein the first zeolitic material having an FAU framework structure comprises one or more zeolites having an FAU framework structure, wherein the one or more zeolites having an FAU framework structure are chosen from Li-LSX, zeolite X, zeolite Y, ECR-30, ZSM-20, LZ-210, SAPO-37, US-Y, CSZ-1, ZSM-3, Faujasite, and mixtures of two or more thereof.

5. The process of claim 3, wherein the mixture prepared in (A) and heated in (B) comprises substantially no phosphorous and/or phosphorous containing compounds.

6. The process of claim 3, wherein the framework of the zeolitic material obtained in (B) comprises substantially no phosphorous.

7. The process of claim 3, wherein the mixture prepared according to (A) further comprises one or more solvents.

8. The process of claim 3, wherein the mixture prepared in (A) and heated in (B) further comprises at least one source for $OH^-$.

9. The process of claim 3, wherein the second zeolitic material having a CHA framework structure comprises one or more zeolites having a CHA framework structure, wherein the one or more zeolites having a CHA framework structure are chosen from Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li—Na| [Al—Si—O]—CHA, (Ni(deta)2)-UT-6, SSZ-13, SSZ-62, and mixtures of two or more thereof.

10. The process of claim 3, wherein the one or more structure directing agents comprises one or more tetraalkylammonium cation-containing compounds.

11. The process of claim 10, wherein the one or more tetraalkylammonium cation-containing compounds comprise one or more compounds of 1-adamantyltri($C_1$-$C_3$)alkylammonium compounds, N,N,N-trimethyl-N-benzylammonium compounds, and mixtures of two or more thereof.

12. The process of claim 10, wherein the one or more tetraalkylammonium cation-containing compounds comprise one or more compounds of N,N,N-tri($C_1$-$C_2$)alkyl-($C_5$-$C_6$)cycloalkylammonium compounds, and mixtures of two or more thereof.

13. The process of claim 1, wherein the mixture prepared in (1) and heated in (2) comprises substantially no phosphorous, phosphorous containing compounds, or both.

14. The process of claim 1, wherein the framework of the zeolitic material obtained in (2) comprises substantially no phosphorous.

* * * * *